(12) United States Patent
Kawamura et al.

(10) Patent No.: US 12,461,598 B2
(45) Date of Patent: Nov. 4, 2025

(54) INFORMATION PROCESSING APPARATUS, VEHICLE CONTROLLING SYSTEM, INFORMATION PROCESSING METHOD, AND NON-TRANSITORY COMPUTER-READABLE MEDIUM

(71) Applicant: NEC Corporation, Tokyo (JP)

(72) Inventors: Toshiaki Kawamura, Tokyo (JP); Yoshihiro Watanabe, Tokyo (JP); Yuichi Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 210 days.

(21) Appl. No.: 18/287,361

(22) PCT Filed: Apr. 20, 2021

(86) PCT No.: PCT/JP2021/015971
§ 371 (c)(1),
(2) Date: Oct. 18, 2023

(87) PCT Pub. No.: WO2022/224332
PCT Pub. Date: Oct. 27, 2022

(65) Prior Publication Data
US 2024/0201790 A1    Jun. 20, 2024

(51) Int. Cl.
*G06F 3/01* (2006.01)
*G06V 20/58* (2022.01)
*G07C 9/00* (2020.01)

(52) U.S. Cl.
CPC .............. *G06F 3/017* (2013.01); *G06F 3/013* (2013.01); *G06V 20/58* (2022.01); *G07C 9/00563* (2013.01)

(58) Field of Classification Search
None
See application file for complete search history.

(56) References Cited

U.S. PATENT DOCUMENTS 11,645,847 B2 *    5/2023    Liu ..................... H04N 23/667
                                                            348/148
2002/0152010 A1    10/2002    Colmenarez et al.
(Continued)

FOREIGN PATENT DOCUMENTS

JP          2008-2095 A        1/2008
JP          2011-032782 A      2/2011
(Continued)

OTHER PUBLICATIONS

International Search Report for PCT Application No. PCT/JP2021/015971, mailed on Jun. 22, 2021.
(Continued)

*Primary Examiner* — Toan H Vu
(74) *Attorney, Agent, or Firm* — Sughrue Mion, PLLC

(57) ABSTRACT

An information processing apparatus includes a first authentication unit, a first vehicle controlling unit, a gesture determining unit, and a second vehicle controlling unit. The first authentication unit controls biometric authentication of a person included in a first captured image, and determines whether the person included in the first captured image is a registered user. The first vehicle controlling unit, if the person included in the first captured image is determined to be a registered user, transmits a first control signal for executing first control. The gesture determining unit controls a gesture determination of whether a gesture of a person included in a second captured image is a registered gesture. The second vehicle controlling unit, if the gesture of the person included in the second captured image is a registered gesture, transmits a second control signal for executing second control.

17 Claims, 25 Drawing Sheets

(56) References Cited

U.S. PATENT DOCUMENTS

| | | | |
|---|---|---|---|
| 2018/0194325 A1* | 7/2018 | Nordbruch | B60R 25/209 |
| 2018/0236975 A1 | 8/2018 | Myers et al. | |
| 2019/0339804 A1* | 11/2019 | Gleeson | G06F 3/0485 |
| 2020/0291676 A1 | 9/2020 | Shah et al. | |
| 2021/0107458 A1* | 4/2021 | Hiei | G06V 20/586 |
| 2021/0287500 A1* | 9/2021 | Conlon | B60R 25/102 |
| 2021/0291790 A1* | 9/2021 | Morosawa | G06V 40/173 |
| 2021/0327011 A1* | 10/2021 | Bielby | G06Q 50/265 |
| 2024/0017669 A1* | 1/2024 | Nagata | B60R 1/007 |

FOREIGN PATENT DOCUMENTS

| | | |
|---|---|---|
| JP | 2012-172367 A | 9/2012 |
| JP | 2020-100963 A | 7/2020 |
| JP | 2021-001447 A | 1/2021 |
| WO | 2014/041955 A1 | 3/2014 |
| WO | 2017/163488 A1 | 9/2017 |
| WO | 2018/156305 A2 | 8/2018 |

OTHER PUBLICATIONS

Extended European Search Report for EP Application No. 21937830.4, dated on Apr. 29, 2024.

* cited by examiner

| REGISTRATION ID | USER ID |
|---|---|
| R1 | U001 |
| R2 | U002 |
| R3 | U003 |

Fig. 9

| GESTURE ID | CONTENT OF REGISTERED GESTURE | | CONTENT OF SECOND CONTROL | |
|---|---|---|---|---|
| | GESTURE TARGET | GESTURE TYPE | SECOND CONTROL TARGET | SECOND CONTROL TYPE |
| G1 | FACE | RIGHT→LEFT | DOOR | OPEN |
| G2 | FACE | LEFT→RIGHT | DOOR | CLOSE |
| G3 | GAZE | DOWN→UP | IG POWER SOURCE | ON |
| G4 | GAZE | UP→DOWN | IG POWER SOURCE | OFF |

Fig. 10

| USER POSITION | CONTENT OF REGISTERED GESTURE | | | CONTENT OF SECOND CONTROL | |
|---|---|---|---|---|---|
| | GESTURE ID | GESTURE TARGET | GESTURE TYPE | SECOND CONTROL TARGET | SECOND CONTROL TYPE |
| A1, A2, B1, B2 | G11 | FACE | RIGHT→LEFT | DOOR | OPEN |
| | G12 | FACE | LEFT→RIGHT | DOOR | CLOSE |
| | G21 | GAZE | DOWN→UP | HOOD | OPEN |
| | G22 | GAZE | UP→DOWN | HOOD | CLOSE |
| | G31 | GAZE | RIGHT→LEFT | FUEL TANK COVER | OPEN |
| | G32 | GAZE | LEFT→RIGHT | FUEL TANK COVER | CLOSE |
| | G41 | FACE | DOWN→UP | TRUNK COVER | OPEN |
| | G42 | FACE | UP→DOWN | TRUNK COVER | CLOSE |
| A1, A2, B1, C1 | G21 | GAZE | DOWN→UP | IG POWER SOURCE | ON |
| | G22 | GAZE | UP→DOWN | IG POWER SOURCE | OFF |
| D1 | G11 | FACE | RIGHT→LEFT | ACC POWER SOURCE | ON |
| | G12 | FACE | LEFT→RIGHT | ACC POWER SOURCE | OFF |

Fig. 19

| USER ID | GESTURE DETERMINING MODEL ID |
|---------|------------------------------|
| U001    | M001                         |
| U002    | M002                         |
| U003    | M003                         |
| ...     | ...                          |

INFORMATION PROCESSING APPARATUS, VEHICLE CONTROLLING SYSTEM, INFORMATION PROCESSING METHOD, AND NON-TRANSITORY COMPUTER-READABLE MEDIUM

This application is a National Stage Entry of PCT/JP2021/015971 filed on Apr. 20, 2021, the contents of all of which are incorporated herein by reference, in their entirety.

TECHNICAL FIELD

The present disclosure relates to information processing apparatuses, vehicle controlling systems, information processing methods, and non-transitory computer-readable media and relates, in particular, to an information processing apparatus, a vehicle controlling system, an information processing method, and a non-transitory computer-readable medium for controlling a vehicle.

BACKGROUND ART

While some vehicle doors can be unlocked contactlessly with the use of electronic keys, such as smart keys, the problem of vehicle theft using a relay attack is becoming more serious in recent years. Therefore, in order to prevent spoofing, a technique has been proposed that unlocks a vehicle door with the use of an electronic key and biometric authentication. For example, Patent Literature 1 discloses a keyless entry device that performs authentication of an electronic key carried by a person based on information obtained through human body communication, and releases a lock if the electronic key is determined to be proper and a face image detected based on a captured image is determined to match a registered face image.

The method described in Patent Literature 1 above, however, has a problem in that its user-friendliness is insufficient since an electronic key is required to unlock a vehicle door and in that the vehicle doors cannot be unlocked if the electronic key is stolen.

Therefore, another technique has been proposed that unlocks a vehicle door with the use of biometric authentication without any electronic keys. For example, a technique has been developed that unlocks a vehicle door with the use of biometric authentication and a gesture. In one example, Patent Literature 2 discloses an unlocking controlling device that performs authentication to determine whether a person who has entered a detection region defined around a vehicle is a predetermined user based on image information of objects located within the detection region and unlocks a door based on behavior information acquired based on the image information.

Another technique has also been developed that controls opening and closing of a vehicle door with the use of biometric authentication and a gesture. In one example, Patent Literature 3 discloses a control device for vehicles that detects a registered user from a captured image capturing the surroundings of a vehicle based on the gait of people in the surroundings, detects the direction of gaze of the registered user from the captured image, and changes the state of a door from a closed state to an open state based on the direction of gaze.

CITATION LIST

Patent Literature

Patent Literature 1: Japanese Unexamined Patent Application Publication No. 2011-032782

Patent Literature 2: Japanese Unexamined Patent Application Publication No. 2020-100963

Patent Literature 3: Japanese Unexamined Patent Application Publication No. 2021-001447

SUMMARY OF INVENTION

Technical Problem

For improved user-friendliness, there is a demand that doors should be not only unlocked contactlessly but also opened or closed contactlessly. However, Patent Literature 2 described above is silent as to such an opening and closing operation of doors and is insufficient in terms of user-friendliness. This applies not only to the opening and closing operation of doors but also to other operations that require the user's intention. Meanwhile, Patent Literature 3 described above is silent as to unlocking of a vehicle door without the use of an electronic key and is insufficient in terms of user-friendliness.

In view of the circumstances above, the present disclosure is directed to providing an information processing apparatus, a vehicle controlling system, an information processing method, and a non-transitory computer-readable medium for improving user-friendliness in operating a vehicle.

Solution to Problem

An information processing apparatus according to one aspect of the present disclosure includes first authentication means, first vehicle controlling means, gesture determining means, and second vehicle controlling means. The first authentication means is configured to, based on a first captured image generated by capturing an image of a scene surrounding a vehicle, control biometric authentication of a person included in the first captured image and determine whether the person included in the first captured image is a registered user. The first vehicle controlling means is configured to, if the person included in the first captured image is determined to be the registered user, transmit a first control signal for executing first control related to unlocking of an opening and closing body of the vehicle. The gesture determining means is configured to, based on a second captured image generated by capturing an image of a scene surrounding the vehicle or an image of an interior of the vehicle, control a gesture determination of whether a gesture of a person included in the second captured image is a registered gesture. The second vehicle controlling means is configured to, if the gesture of the person included in the second captured image is the registered gesture, transmit a second control signal for executing second control. The second control is second control corresponding to the gesture of the person and performed on a predetermined opening and closing body of the vehicle or on a power source of the vehicle, and the second control is different from the first control.

A vehicle controlling system according to one aspect of the present disclosure includes a biometric authentication apparatus that executes biometric authentication and an information processing apparatus. The information processing apparatus includes first authentication means, first vehicle controlling means, gesture determining means, and second vehicle controlling means. The first authentication means is configured to cause the biometric authentication apparatus to execute, based on a first captured image generated by capturing an image of a scene surrounding a vehicle, biometric authentication of a person included in the first captured image and determine whether the person included in the first captured image is a registered user. The first vehicle controlling means is configured to, if the person included in the first captured image is determined to be the registered user, transmit a first control signal for executing first control related to unlocking of an opening and closing body of the vehicle. The gesture determining means is configured to, based on a second captured image generated by capturing an image of a scene surrounding the vehicle or an image of an interior of the vehicle, control a gesture determination of whether a gesture of a person included in the second captured image is a registered gesture. The second vehicle controlling means is configured to, if the gesture of the person included in the second captured image is the registered gesture, transmit a second control signal for executing second control. The second control is second control corresponding to the gesture of the person and performed on a predetermined opening and closing body of the vehicle or on a power source of the vehicle, and the second control is different from the first control.

An information processing method according to one aspect of the present disclosure includes a first authentication step, a first vehicle controlling step, a gesture determining step, and a second vehicle controlling step. The first authentication step is a step of, based on a first captured image generated by capturing an image of a scene surrounding a vehicle, controlling biometric authentication of a person included in the first captured image and determining whether the person included in the first captured image is a registered user. The first vehicle controlling step is a step of, if the person included in the first captured image is determined to be the registered user, transmitting a first control signal for executing first control related to unlocking of an opening and closing body of the vehicle. The gesture determining step is a step of, based on a second captured image generated by capturing an image of a scene surrounding the vehicle or an image of an interior of the vehicle, controlling a gesture determination of whether a gesture of a person included in the second captured image is a registered gesture. The second vehicle controlling step is a step of, if the gesture of the person included in the second captured image is the registered gesture, transmitting a second control signal for executing second control. The second control is second control corresponding to the gesture of the person and performed on a predetermined opening and closing body of the vehicle or on a power source of the vehicle, and the second control is different from the first control.

A non-transitory computer-readable medium according to one aspect of the present disclosure stores a program that causes a computer to execute a first authentication step, a first vehicle controlling step, a gesture determining step, and a second vehicle controlling step. The first authentication step is a step of, based on a first captured image generated by capturing an image of a scene surrounding a vehicle, controlling biometric authentication of a person included in the first captured image and determining whether the person included in the first captured image is a registered user. The first vehicle controlling step is a step of, if the person included in the first captured image is determined to be the registered user, transmitting a first control signal for executing first control related to unlocking of an opening and closing body of the vehicle. The gesture determining step is a step of, based on a second captured image generated by capturing an image of a scene surrounding the vehicle or an image of an interior of the vehicle, controlling a gesture determination of whether a gesture of a person included in the second captured image is a registered gesture. The second vehicle controlling step is a step of, if the gesture of the person included in the second captured image is the registered gesture, transmitting a second control signal for executing second control. The second control is second control corresponding to the gesture of the person and performed on a predetermined opening and closing body of the vehicle or on a power source of the vehicle, and the second control is different from the first control.

Advantageous Effects of Invention

The present disclosure can provide an information processing apparatus, a vehicle controlling system, an information processing method, and a non-transitory computer-readable medium for improving user-friendliness in operating a vehicle.

BRIEF DESCRIPTION OF DRAWINGS

FIG. 9 shows one example of a data structure of user information according to the second example embodiment;

FIG. 10 shows one example of a data structure of a gesture table according to the second example embodiment;

FIG. 19 shows one example of a data structure of a gesture table according to the third example embodiment;

EXAMPLE EMBODIMENT

Figure 1:
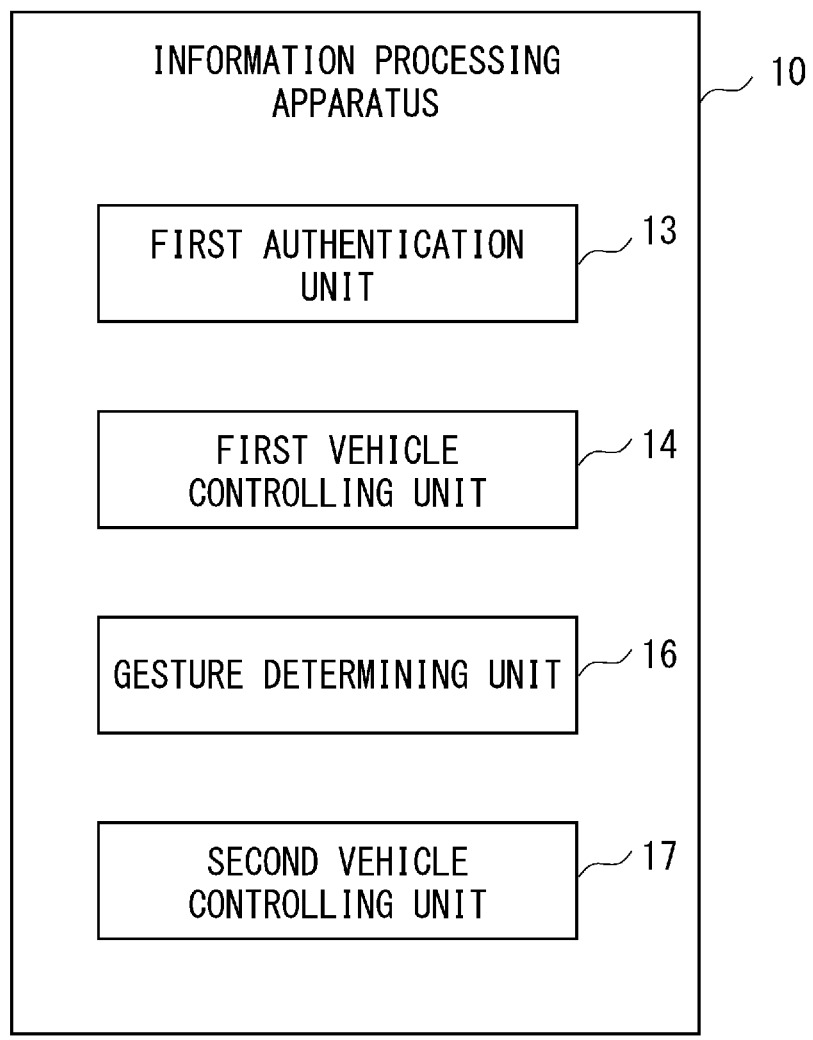
FIG. 1 is a block diagram showing a configuration of an information processing apparatus according to a first example embodiment.

Hereinafter, some example embodiments of the present disclosure will be described in detail with reference to the drawings. In the drawings, identical or corresponding elements are given identical reference characters, and duplicate description thereof will be omitted as necessary to make the description clearer.

Problem for Example Embodiments

Now, problems for example embodiments will be described again.

In recent years, some vehicle doors can be unlocked contactlessly with the use of electronic keys, such as smart keys. However, there is a problem in that the vehicle doors cannot be unlocked if the electronic key is stolen. Furthermore, the problem of vehicle theft using a relay attack is becoming more serious these days.

Patent Literature 1 described above discloses a method of unlocking a vehicle door with the use of an electronic key and face authentication. However, as described above, this method requires an electronic key to unlock a vehicle door and has a problem of insufficient user-friendliness.

Hence, another technique has been proposed that unlocks a vehicle door with the use of biometric authentication without any electronic keys. Furthermore, there is a demand that doors should be not only unlocked contactlessly but also opened or closed contactlessly. Yet, it is difficult to meet such a demand with the method described in Patent Literature 2 or 3 above.

Accordingly, in one conceivable method, a door may be both unlocked and opened if biometric authentication succeeds. Although this method can improve user-friendliness in automatic unlocking, the method has a problem in that a door may be opened unintentionally since the door is opened upon being unlocked without exception.

In another conceivable method, a door may be both unlocked and opened based on biometric authentication and a gesture. This method, however, has a problem in that the method cannot handle a case in which the user only wants to unlock a door.

This applies not only to the opening and closing operation of a door but also to other operations that require a user's intention.

Accordingly, there is an increasing demand for improved user-friendliness in operating a vehicle. The present example embodiments have been made to solve such problems.

First Example Embodiment

First, a first example embodiment of the present disclosure will be described. FIG. 1 is a block diagram showing a configuration of an information processing apparatus 10 according to the first example embodiment. The information processing apparatus 10 is a computer for executing unlocking control of an opening and closing body of a vehicle and various other control related to the vehicle. The information processing apparatus 10 acquires a captured image generated by capturing an image of a scene surrounding the vehicle or a captured image generated by capturing an image of the interior of the vehicle, and executes the control mentioned above based on the acquired captured image. A captured image generated by capturing an image of a scene surrounding a vehicle under a predetermined condition is referred to as a first captured image. For example, a first captured image is a captured image generated by capturing an image of a scene surrounding a vehicle while an opening and closing body of the vehicle is in a locked state. Meanwhile, a captured image generated by capturing an image of a scene surrounding a vehicle or an image of the interior of the vehicle under a predetermined condition is referred to as a second captured image. For example, a second captured image is a captured image generated by capturing an image of a scene surrounding a vehicle while an opening and closing body of the vehicle is in an unlocked state.

The information processing apparatus 10 includes a first authentication unit 13, a first vehicle controlling unit 14, a gesture determining unit 16, and a second vehicle controlling unit 17.

The first authentication unit 13 is also referred to as a first authentication means. The first authentication unit 13, based on a first captured image, controls biometric authentication of a person included in the first captured image and determines whether the person included in the first captured image is a registered user. Controlling biometric authentication may mean that the first authentication unit 13 executes biometric authentication or that the first authentication unit 13 causes another apparatus, such as a biometric authentication apparatus, to execute biometric authentication. Herein, biometric authentication is biometric authentication that can extract biometric information by a captured image, and examples of such biometric authentication include face authentication, iris authentication, vein authentication, and pinna authentication.

The first vehicle controlling unit 14 is also referred to as a first vehicle controlling means. If a person included in a first captured image is determined to be a registered user, the first vehicle controlling unit 14 transmits a first control signal for executing first control. First control is control related to the unlocking of an opening and closing body of a vehicle.

The gesture determining unit 16 is also referred to as a gesture determining means. The gesture determining unit 16, based on a second captured image, controls a gesture determination of whether a gesture of a person included in the second captured image is a registered gesture. Controlling a gesture determination may mean that the gesture determining unit 16 executes a gesture determination or that the gesture determining unit 16 causes another apparatus, such as a gesture determining apparatus, to execute a gesture determination.

The second vehicle controlling unit 17 is also referred to as a second vehicle controlling means. If a gesture of a person included in a second captured image is a registered gesture, the second vehicle controlling unit 17 transmits a second control signal for executing second control related to the vehicle. Second control is control on a predetermined opening and closing body of a vehicle or on a power source of a vehicle and is control different from first control. Second control is defined in accordance with a gesture of a person. A predetermined opening and closing body of a vehicle may be the same as the opening and closing body of the vehicle controlled in first control, may be an opening and closing body that is a part of the opening and closing body of the vehicle controlled in first control, or may be another opening and closing body included in the vehicle.

Figure 2:
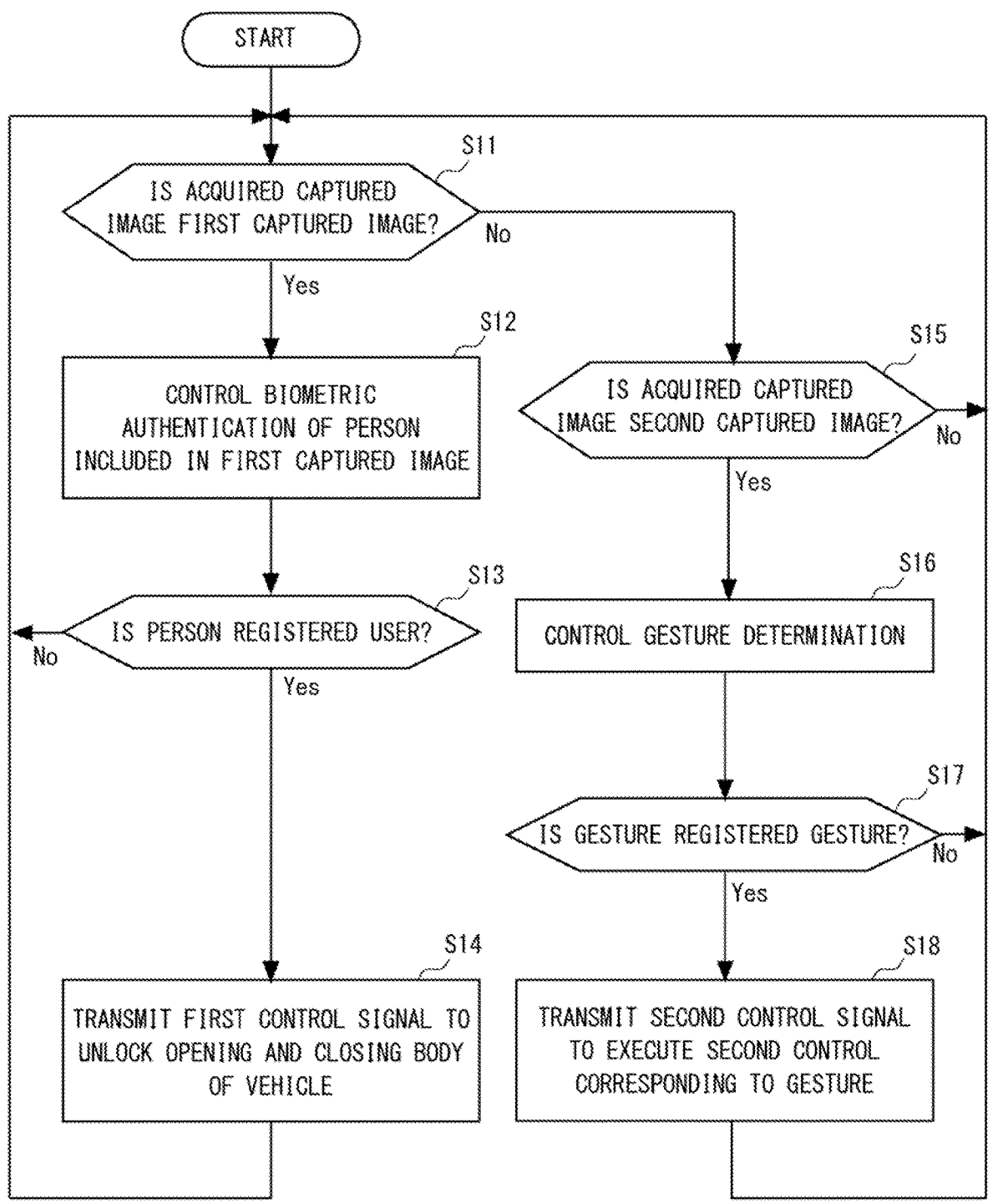
FIG. 2 is a flowchart showing a flow of information processing according to the first example embodiment.

FIG. 2 is a flowchart showing a flow of information processing according to the first example embodiment. First, the first authentication unit 13 of the information processing apparatus 10 determines whether a captured image that the information processing apparatus 10 has acquired is a first captured image generated by capturing an image of a scene surrounding the vehicle (S11). If the captured image that the information processing apparatus 10 has acquired is a first captured image (Yes at S11), the first authentication unit 13, based on the first captured image, controls biometric authentication of a person included in the first captured image (S12). Next, based on the result of the biometric authentication, the first authentication unit 13 determines whether the person included in the first captured image is a registered user (S13). If it is determined that the person included in the first captured image is a registered user (Yes at S13), the first vehicle controlling unit 14 transmits a first control signal for unlocking an opening and closing body of the vehicle (S14) and returns the process to step S11. Meanwhile, if it is not determined that the person included in the first captured image is a registered user (No at S13), the first authentication unit 13 returns the process to step S11 without any further processing.

If the captured image that the information processing apparatus 10 has acquired is not a first captured image (No at S11), the gesture determining unit 16 determines whether the captured image that the information processing apparatus 10 has acquired is a second captured image generated by capturing an image of a scene surrounding the vehicle or an image of the interior of the vehicle (S15). If the captured image that the information processing apparatus 10 has acquired is not a second captured image (No at S15), the gesture determining unit 16 returns the process to step S11. Meanwhile, if the captured image that the information processing apparatus 10 has acquired is a second captured image (Yes at S15), the gesture determining unit 16, based on the second captured image, controls a gesture determination of a person included in the second captured image (S16). Then, if the gesture of the person included in the second captured image is a registered gesture (Yes at S17), the second vehicle controlling unit 17 transmits a second control signal for executing second control corresponding to the gesture (S18) and returns the process to step S11. Meanwhile, if the gesture of the person included in the second captured image is not a registered gesture (No at S17), the gesture determining unit 16 returns the process to step S11.

In this manner, according to the first example embodiment, the information processing apparatus 10 executes control of unlocking an opening and closing body of a vehicle by biometric authentication and executes control of other than the unlocking of the vehicle by a gesture determination. With this configuration, the user can contactlessly, without using an electronic key, unlock a vehicle door and also perform other operations related to the vehicle.

Herein, since the information processing apparatus 10 performs control of other than the unlocking of a vehicle by a gesture determination based on the user's intention, this configuration can prevent a situation in which a door is opened unintentionally, unlike in a method in which a door is unlocked and opened if biometric authentication succeeds. Furthermore, unlike in a method in which a door is unlocked and opened by two-element authentication, namely biometric authentication and a gesture, the information processing apparatus 10 can handle a case in which the user only wants to unlock a door. Accordingly, user-friendliness in operating a vehicle improves.

Second Example Embodiment

Figure 3:
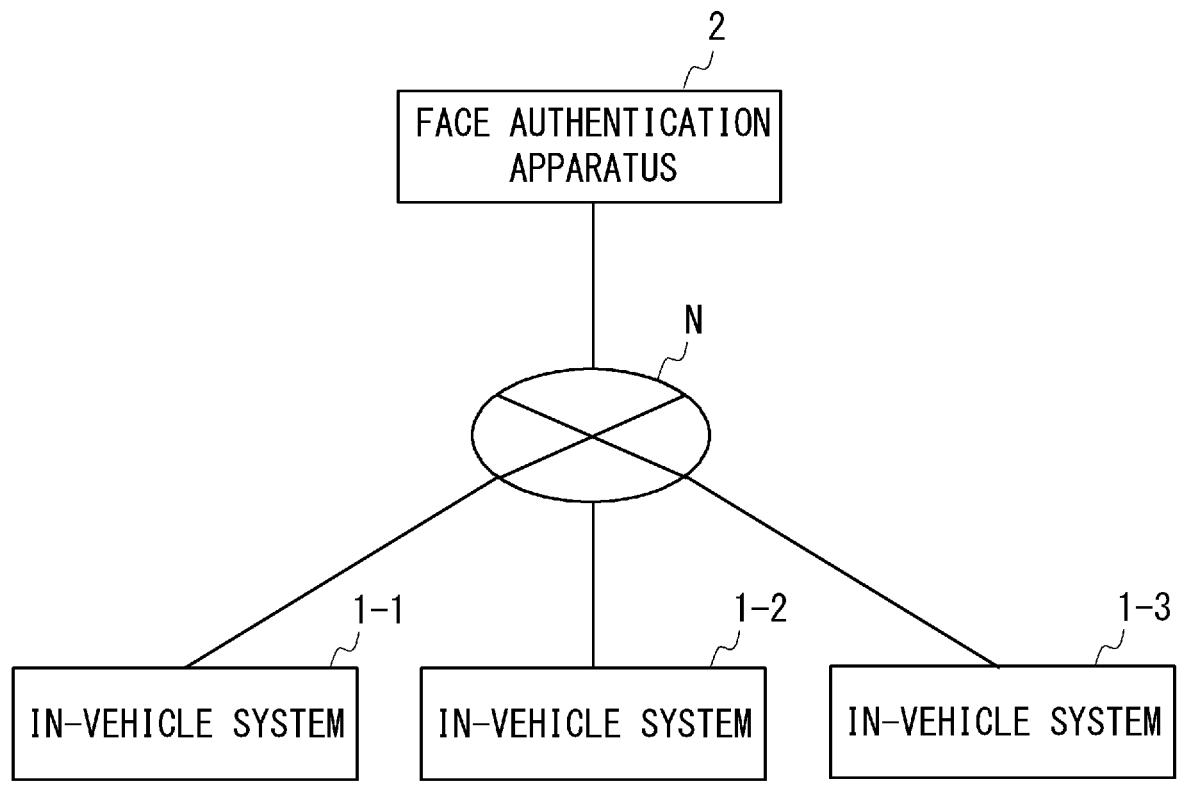
FIG. 3 is a block diagram showing an overall configuration of a vehicle controlling system according to a second example embodiment.

Next, a second example embodiment of the present disclosure will be described. FIG. 3 is a block diagram showing an overall configuration of a vehicle controlling system 900 according to the second example embodiment. The vehicle controlling system 900 is a computer system for implementing various control related to a vehicle with the use of biometric authentication. Various control related to a vehicle includes control concerning the unlocking and locking of an opening and closing body of the vehicle and other control that requires the user's intention. An opening and closing body may be, for example but not limited to, a front door, a rear door, a hood, a fuel tank cover, a door glass (window), or a trunk cover. Herein, control concerning the unlocking of an opening and closing body of a vehicle is referred to as first control, control concerning the locking of an opening and closing body of a vehicle is referred to as third control, and other control that requires the user's intention is referred to as second control. Second control may be, for example, control concerning the opening or closing of an opening and closing body of a vehicle or may be the starting or stopping of a power source of a vehicle. A power source of a vehicle may be an ignition power source (IG power source) or an accessory power source (ACC power source).

In the second example embodiment, biometric authentication is face authentication. Alternatively, biometric authentication may be other biometric authentication that can extract biometric information by a captured image, and examples of such biometric authentication include iris authentication, vein authentication, and pinna authentication.

The vehicle controlling system 900 includes in-vehicle systems 1-1, 1-2, and 1-3 and a face authentication apparatus 2, and these components are connected communicably via a network N. Herein, the network N is a wired or wireless communication circuit.

The in-vehicle systems 1-1, 1-2, and 1-3 are each provided in a different vehicle, and each of the in-vehicle systems 1-1, 1-2, and 1-3 executes first control, second control, and third control of its corresponding vehicle. In the following description, the in-vehicle systems 1-1, 1-2, and 1-3 may be referred simply as an in-vehicle system or in-vehicles systems 1, when not differentiated therebetween. The number of in-vehicle systems 1 included in the vehicle controlling system 900 is not limited to three.

An in-vehicle system 1 controls face authentication and executes first control based on a face authentication result. In the second example embodiment, face authentication is performed by the face authentication apparatus 2. Therefore, the in-vehicle system 1 controls face authentication by transmitting, to the face authentication apparatus 2, a face authentication request regarding a user U to be authenticated and by receiving a face authentication result from the face authentication apparatus 2. A face authentication request includes a face image, which is a captured image that includes at least a face region of the user U. A face authentication request may include, instead of a face image, face information extracted from a face image. The in-vehicle system 1 also determines a gesture of the user U to be authenticated and executes second control based on the gesture determination result. The in-vehicle system 1 also executes third control under a predetermined condition.

The face authentication apparatus 2 is one example of a biometric authentication apparatus that executes biometric authentication. The face authentication apparatus 2 is an information processing apparatus that stores face information of a plurality of persons. The face authentication apparatus 2, in response to a face authentication result received from the outside, compares the face image or face information included in the received request against the face information of each user U, and returns a comparison result (a face authentication result) to the requester.

Figure 4:
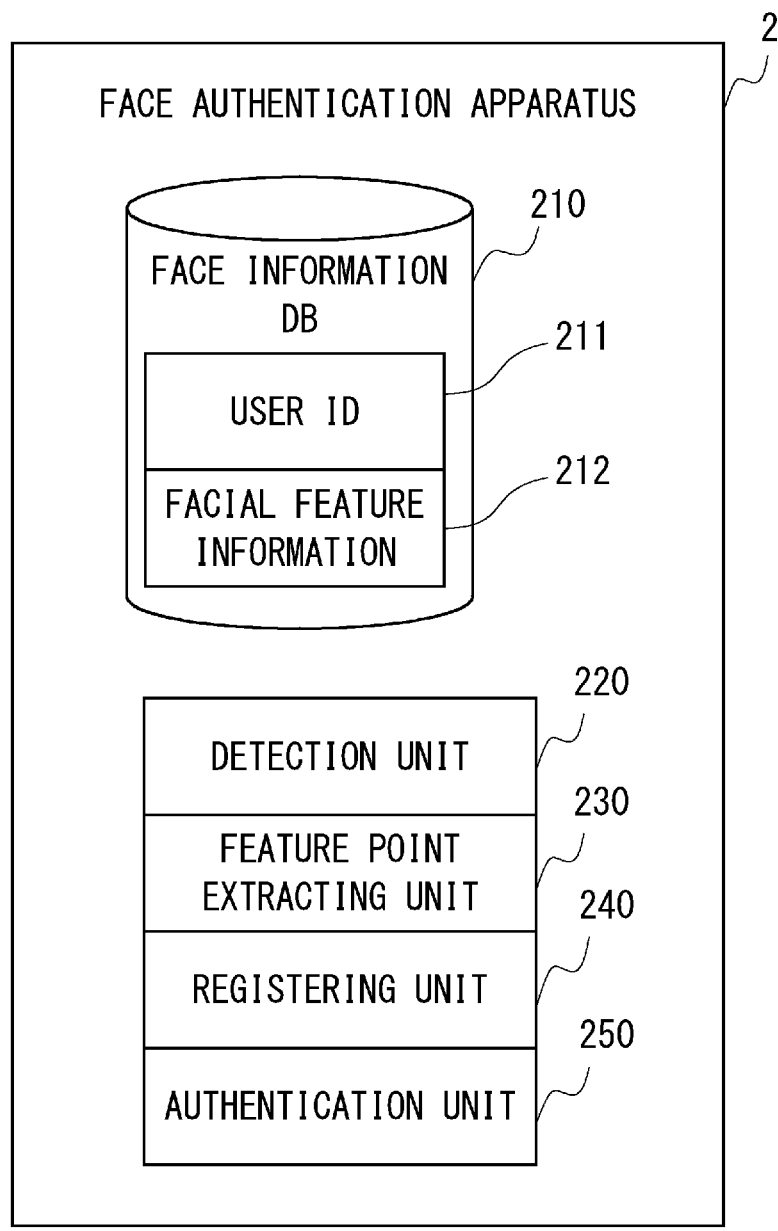
FIG. 4 is a block diagram showing a configuration of a face authentication apparatus according to the second example embodiment.

FIG. 4 is a block diagram showing a configuration of a face authentication apparatus according to the second example embodiment. The face authentication apparatus 2 includes a face information database (DB) 210, a detection unit 220, a feature point extracting unit 230, a registering unit 240, and an authentication unit 250. The face information DB 210 stores a user ID 211 and facial feature information 212 corresponding to this user ID with the user ID 211 and the facial feature information 212 linked to each other. The facial feature information 212 is a set of feature points extracted from a face image and is one example of face information.

The detection unit 220 detects a face region included in a registration image for registering face information and supplies the detected face region to the feature point extracting unit 230. The feature point extracting unit 230 extracts feature points from the face region detected by the detection unit 220 and supplies facial feature information to the registering unit 240. Furthermore, the feature point extracting unit 230 extracts feature points included in a face image for authentication and supplies facial feature information to the authentication unit 250.

The registering unit 240 issues a new user ID 211 when registering the facial feature information. The registering unit 240 registers the issued user ID 211 and the facial feature information 212 extracted from the registration image into the face information DB 210 with the user ID 211 and the facial feature information 212 linked to each other. The authentication unit 250 performs face authentication with the use of the facial feature information 212. Specifically, the authentication unit 250 compares the facial feature information extracted from the face image against the facial feature information 212 in the face information DB 210. The authentication unit 250 returns, to an information processing apparatus 100, the presence or absence of a match between the two pieces of facial feature information. The presence or absence of a match between the two pieces of facial feature information corresponds to the success or failure of the authentication. Herein, that two pieces of facial feature information match (facial feature information has a match) means that the degree of match is no lower than a predetermined value.

Figure 5:
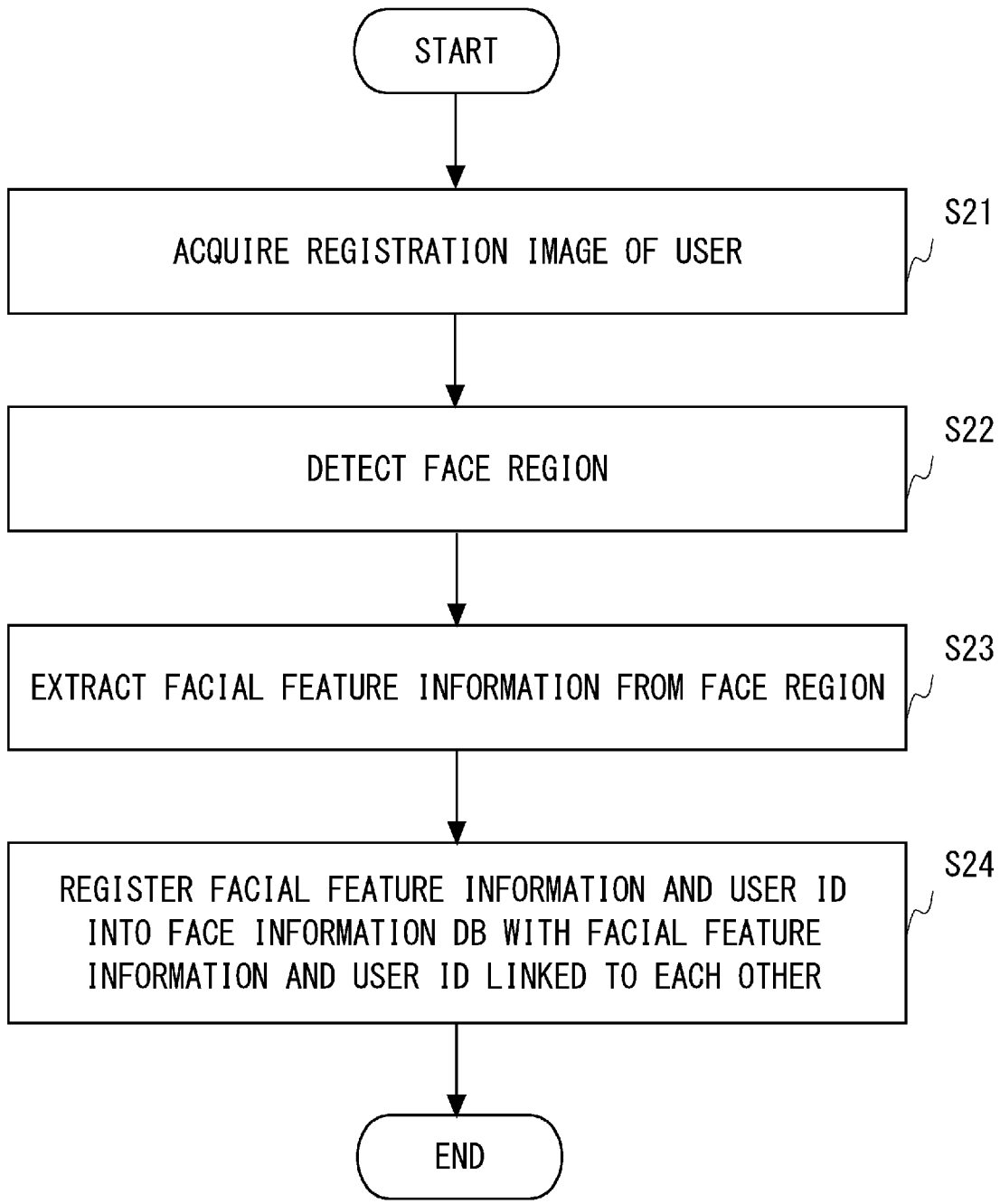
FIG. 5 is a flowchart showing a flow of a face information registration process according to the second example embodiment.

FIG. 5 is a flowchart showing a flow of a face information registration process according to the second example embodiment. First, the face authentication apparatus 2 acquires a registration image of a user U included in a face information registration request (S21). For example, the face authentication apparatus 2 receives a face information registration request from the information processing apparatus 100 or a user terminal (not illustrated) via the network N. Next, the detection unit 220 detects a face region included in the registration image (S22). Next, the feature point extracting unit 230 extracts feature points from the face region detected at step S22 and supplies facial feature information to the registering unit 240 (S23). Lastly, the registering unit 240 issues a user ID 211 and registers this user ID 211 and the facial feature information 212 into the face information DB 210 with the user ID 211 and the facial feature information 212 linked to each other (S24). Herein, the face authentication apparatus 2 may receive the facial feature information 212 from the requester of the face information registration and register the facial feature information 212 into the face information DB 210 with the facial feature information 212 linked to the user ID 211.

Figure 6:
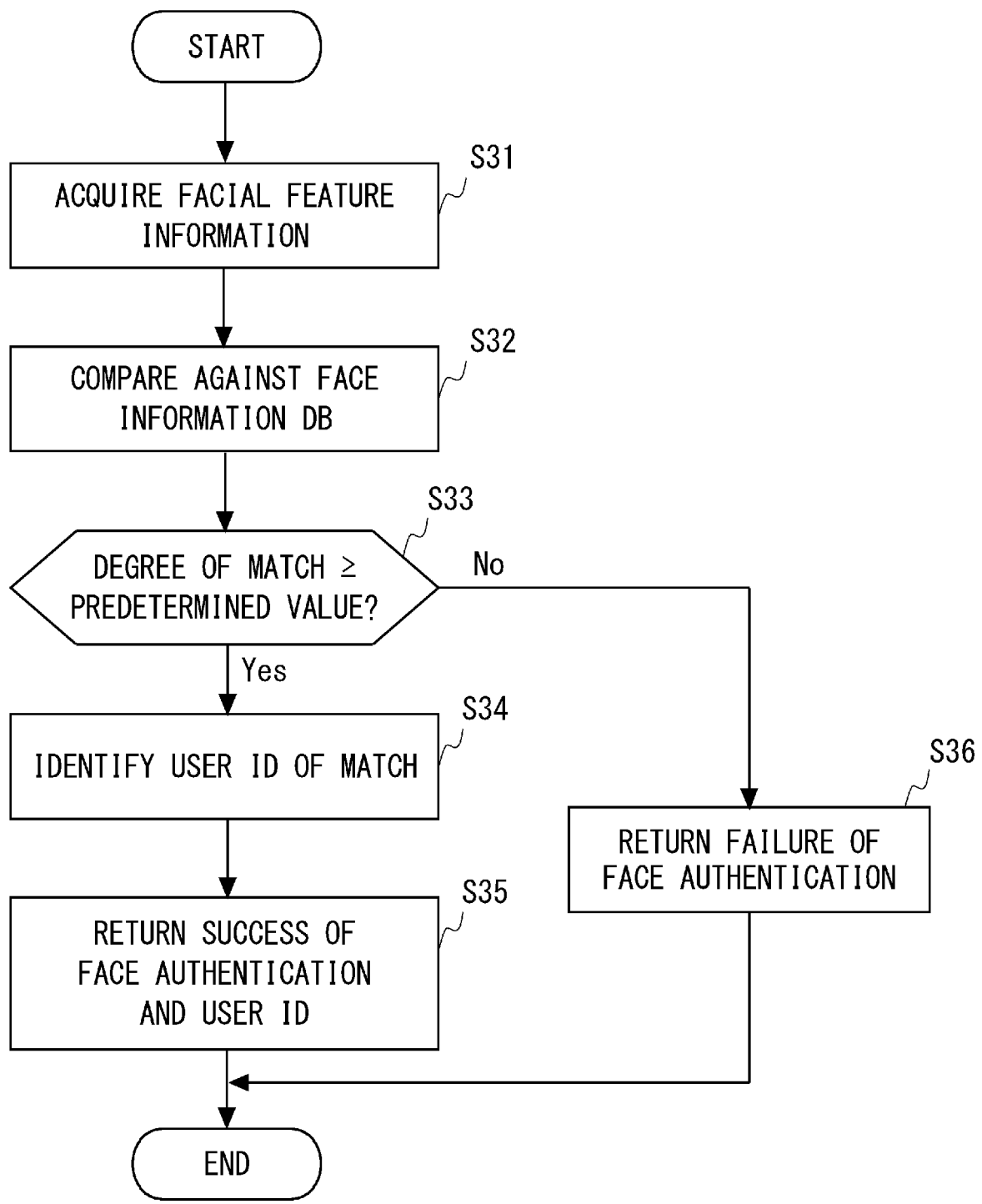
FIG. 6 is a flowchart showing a flow of a face authentication process according to the second example embodiment.

FIG. 6 is a flowchart showing a flow of a face authentication process according to the second example embodiment. First, the feature point extracting unit 230 acquires facial feature information for authentication (S31). For example, the face authentication apparatus 2 receives a face authentication request from the information processing apparatus 100 via the network N and extracts facial feature information, as in steps S21 to S23, from the captured image included in the face authentication request. Alternatively, the face authentication apparatus 2 may receive facial feature information from the information processing apparatus 100. Next, the authentication unit 250 compares the acquired facial feature information against the facial feature information 212 in the face information DB 210 (S32). If the facial feature information has a match, that is, if the degree of match of the facial feature information is no lower than a predetermined value (Yes at S33), the authentication unit 250 identifies the user ID 211 of the user whose facial feature information has a match (S34). The authentication unit 250 then returns, to the information processing apparatus 100, the success of the face authentication and the identified user ID 211 as the face authentication result (S35). If there is no matching facial feature information (No at S33), the authentication unit 250 returns, to the information processing apparatus 100, the failure of the face authentication as the face authentication result (S36).

Figure 7:
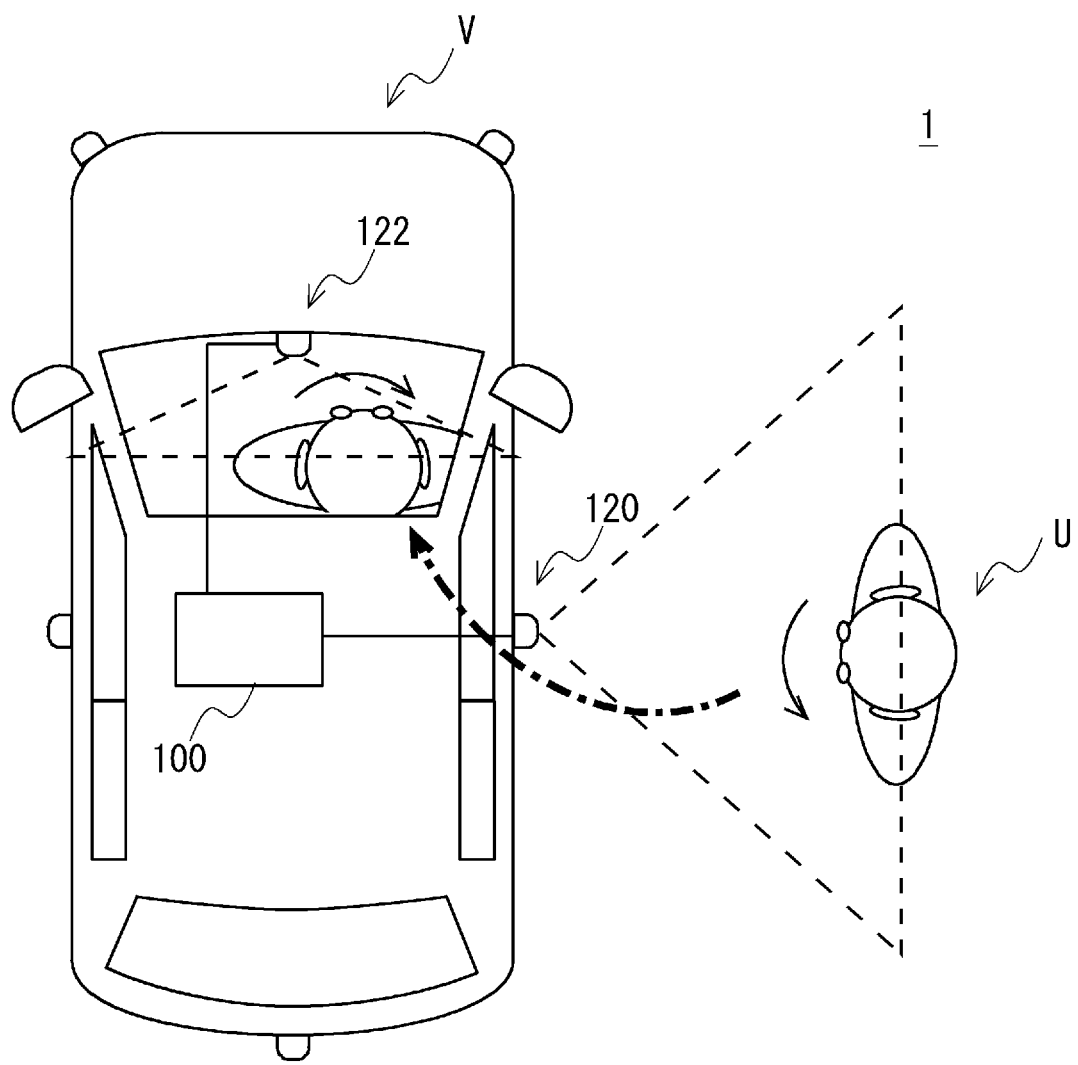
FIG. 7 is a schematic configuration diagram of an in-vehicle system according to the second example embodiment.

FIG. 7 is a schematic configuration diagram of an in-vehicle system 1 according to the second example embodiment. The in-vehicle system 1 is provided in a vehicle V. The in-vehicle system 1 includes at least an information processing apparatus 100 and an onboard camera provided in the vehicle V. The onboard camera is connected to the information processing apparatus 100. According to the second example embodiment, a plurality of onboard cameras are provided, and the plurality of onboard cameras include a periphery camera 120 and an in-vehicle camera 122. The periphery camera 120 captures an image of a peripheral scene outside the vehicle V, and the in-vehicle camera 122 captures an image of the interior of the vehicle V.

If a user U wants to unlock the locked vehicle V to get in the vehicle V, the user U first approaches the vicinity of the vehicle V. Then, the periphery camera 120 captures an image of the user U located in the vicinity of the vehicle V and generates a first captured image. Then, the information processing apparatus 100 controls face authentication based on the first captured image and determines whether the user U is a registered user set in advance. If the information processing apparatus 100 determines that the user U is a registered user, the information processing apparatus 100 performs control to unlock a door (first control). Herein, the face authentication for unlocking a door may be referred to as first face authentication.

Upon the door entering an unlocked state, the user U executes a predetermined gesture. At this point, the periphery camera 120 captures an image of the user U located in the vicinity of the vehicle V and generates a second captured image. In the second example embodiment, the second captured image is an image different from the first captured image described above. Alternatively, the second captured image may be the same as the first captured image. Based on the second captured image, the information processing apparatus 100 then controls a gesture determination of whether the gesture of the user U is a registered gesture registered in advance. If the information processing apparatus 100 determines that the gesture of the user U is a registered gesture, the information processing apparatus 100 executes second control corresponding to the gesture of the user U. Herein, targets and types of second control may be set in accordance with registered gestures. For example, the information processing apparatus 100 may open the passenger side door if the user U makes a gesture of changing the direction of his or her face from right to left, or the information processing apparatus 100 may start the IG power source if the user U makes a gesture of changing the direction of his or her gaze from down to up.

Herein, a second captured image may be captured while the user U is inside the vehicle. For example, upon the doors entering an unlocked state, the user U opens the driver's side door and gets in the driver's seat. The user U then executes a predetermined gesture. At this point, the in-vehicle camera 122 captures an image of the user U inside the vehicle V and generates a second captured image. Based on the second captured image, the information processing apparatus 100 then controls a gesture determination of whether the gesture of the user U is a registered gesture registered in advance. If the information processing apparatus 100 determines that the gesture of the user U is a registered gesture, the information processing apparatus 100 executes second control corresponding to the gesture of the user U. For example, the information processing apparatus 100 may turn on the IG power source of the vehicle V if the user U makes a gesture of changing the direction of his or her gaze from down to up.

When the user U has gotten out of the vehicle and the door has been closed, the information processing apparatus 100 performs control of locking the door when a predetermined length of time has passed after the closing of the door (third control).

Figure 8:
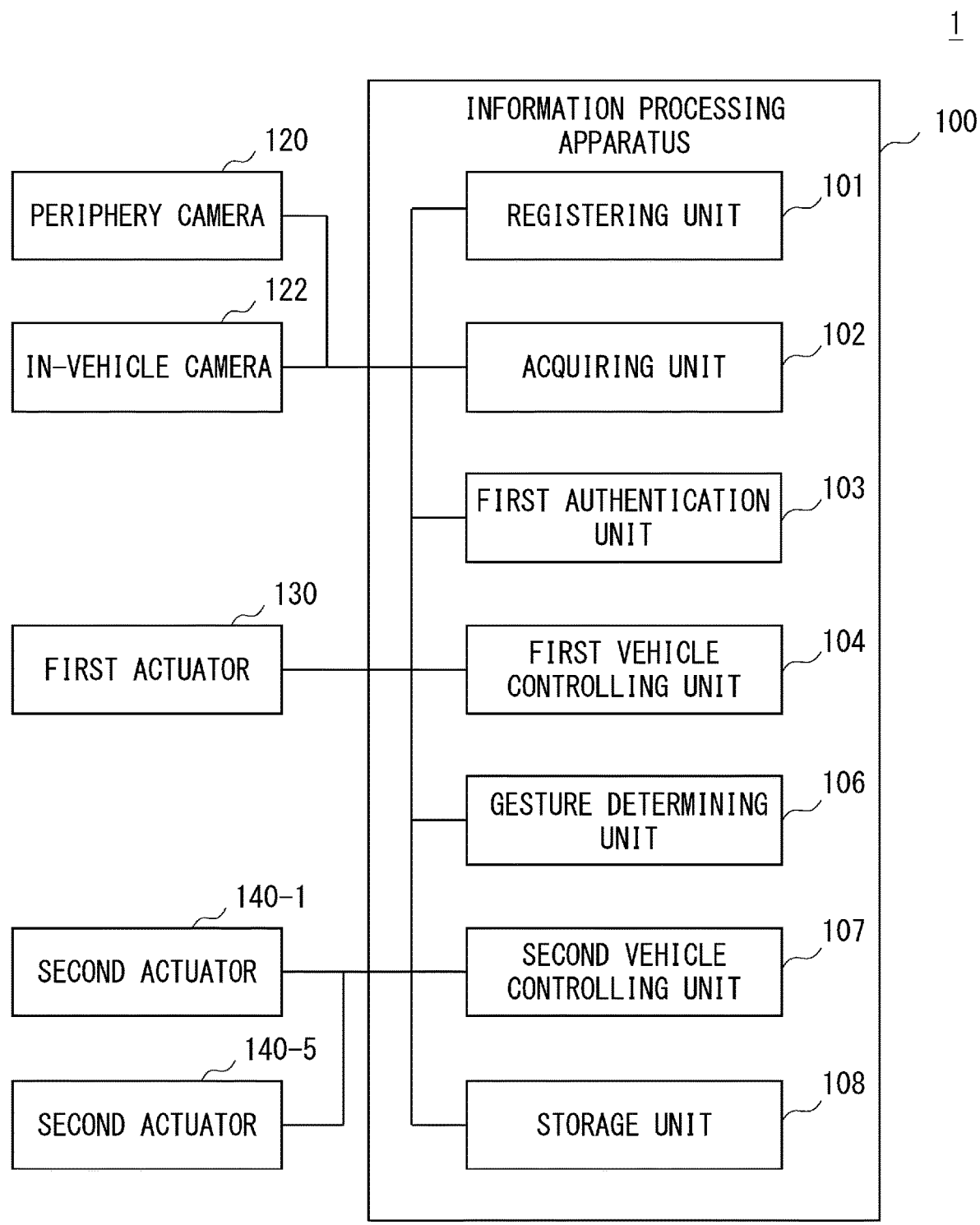
FIG. 8 is a block diagram showing a configuration of an in-vehicle system according to the second example embodiment.

FIG. 8 is a block diagram showing a configuration of the in-vehicle system 1 according to the second example embodiment. The in-vehicle system 1 includes the information processing apparatus 100, the periphery camera 120, the in-vehicle camera 122, a first actuator 130, and second actuators 140-1 and 140-5.

The information processing apparatus 100 is one example of the information processing apparatus 10 described above. The information processing apparatus 100 includes a registering unit 101, an acquiring unit 102, a first authentication unit 103, a first vehicle controlling unit 104, a gesture determining unit 106, a second vehicle controlling unit 107, and a storage unit 108.

The registering unit 101 is also referred to as a registering means. The registering unit 101 transmits a face information registration request including a registration image to the face authentication apparatus 2 via the network N. Furthermore, the registering unit 101 stores a user ID issued by the face authentication apparatus 2 at the time of the face information registration into the storage unit 108 as user information. The user ID recorded as user information is the user ID of the registered user of the vehicle V.

FIG. 9 shows one example of a data structure of user information according to the second example embodiment. As shown in this figure, the user information includes user IDs for respective registration IDs.

The description continues with reference back to FIG. 8. The registering unit 101 registers gestures for executing second control into a gesture table. Each gesture registered is referred to as a registered gesture.

FIG. 10 shows one example of a data structure of the gesture table according to the second example embodiment. The gesture table links the content of each registered gesture to the content of corresponding second control.

The content of the registered gesture is information linking the gesture target and the gesture type and is identified by the gesture ID. The gesture target is a body part of a portion of a body part for making a gesture and is a person's face or gaze in FIG. 10. Targets of gestures are not limited to these examples and may also include a hand. The gesture type is information indicating how the gesture target is to be moved. The gesture type may indicate "changing the direction," such as "changing the direction from right to left" or "changing the direction from up to down." The gesture type may also indicate "bringing (one body) closer to the vehicle V." The gesture type may also indicate "touching the face region or a specific region around the face," such as "touching an ear (with a hand)" or "touching the nose (with a hand)." Herein, the content of one registered gesture may be composed of a set of a gesture target and gesture type or composed of a plurality of sets of a gesture target and gesture type. In other words, the content of a registered gesture may be set based at least one of on the direction of a person's face or on the direction of a person's gaze and may, for example, indicate "changing the direction of the face from right to left to front to down to up." A registered gesture may be that a person "sequentially touches his or her ear, nose, and mouth."

The content of the second control is information linking the second control target and the second control type. A second control target is a part of the vehicle V that is to be controlled in the second control, and is a door or the IG power source in FIG. 10. The second control targets are not limited to these example, and a second control target may be an opening and closing body other than a door, such as a door glass, a hood, a fuel tank cover, or a trunk cover, or may be a power source other than the IG power source, such as the ACC power source. The second control type is information indicating how the second control target is to be controlled. The second control type may be control related to opening and closing, such as "opening (an opening and closing body)" or "closing (an opening and closing body)," or may be control related to starting and stopping of a power source, such as "starting (a power source)" or "stopping (a power source)." In other words, the content of the second control may be the opening of a door, the closing of a door, the starting of the IG power source, the stopping of the IG power source, the starting of the ACC power source, the stopping of the ACC power source, the opening of the fuel tank cover, the closing of the fuel tank cover, the opening of the trunk cover, the closing of the trunk cover, the opening of the hood, the closing of the hood, the opening of a door glass (window), or the closing of a door glass. Herein, the content of one second control may be composed of a set of a second control target and second control type or composed of a plurality of sets of a second control target and second control type. In other words, the content of the second control may be set based at least one of on the opening or closing of an opening and closing body or on the starting or stopping of a power source, and may, for example, indicate "opening a door and starting the IG power source."

Herein, the direction of control indicated by a second control type may be set in advance so as to correspond to the direction of change indicated by the gesture type. In other words, if the gesture target is a face or a gaze, the content of the second control may indicate control of opening or closing an opening and closing body of the vehicle V to the direction corresponding to the direction of the gaze or the direction of the face indicated by the gesture type. For example, if the content of the registered gesture indicates "changing the direction of the face from right to left," the content of the second control may indicate "sliding a sliding door from right to left to open the sliding door." With this configuration, the user U merely needs to make an intuitive gesture, which improves ease of operation.

The description continues with reference back to FIG. 8. The acquiring unit 102 is also referred to as an acquiring means. The acquiring unit 102 is connected to the periphery camera 120 and to the in-vehicle camera 122 and acquires a captured image from the periphery camera 120 and from the in-vehicle camera 122. If the doors of the vehicle V are in a locked state, the acquiring unit 102 supplies a captured image acquired from the periphery camera 120 to the first authentication unit 103 as a first captured image. Meanwhile, if the doors of the vehicle V are in an unlocked state, the acquiring unit 102 supplies a captured image acquired from the periphery camera 120 or from the in-vehicle camera 122 to the gesture determining unit 106 as a second captured image. Herein, a second captured image is an image captured at a timing different from the timing at which a first captured image is captured, but if the doors of the vehicle V enter an unlocked state by a first control signal described later, the acquiring unit 102 may supply, as a second captured image, an image identical to a first captured image to the gesture determining unit 106.

Herein, the acquiring unit 102 may acquire a captured image from the periphery camera 120 and from the in-vehicle camera 122 continually at predetermined intervals.

In this case, the acquiring unit 102 may supply a captured image acquired from the periphery camera 120 to the first authentication unit 103 as a first captured image, if the doors of the vehicle V are in a locked state and if a predetermined first captured image acquiring condition is satisfied. A first captured image acquiring condition may also be referred to as a first authentication starting condition. A first captured image acquiring condition may be that the user U included in a captured image captured by the periphery camera 120 is located within a region (a first captured image acquiring region) set in advance with the vehicle V serving as a reference. For example, whether the user U is located within the first captured image acquiring region may be determined based on whether the size or the width or length of the face region of the user U included in the captured image captured by the periphery camera 120 is no less than a predetermined number of pixels. In another example, whether the user U is located within the first captured image acquiring region may be determined based on whether the length connecting feature points of a predetermined facial part in the face region of the user U included in the captured image captured by the periphery camera 120 is no less than a predetermined number of pixels. The feature points of a facial part may at least two selected from the right eye, the left eye, an end point of the nose, an end point of the mouth, an end point of the right eyebrow, and an end point of the left eyebrow. In one example, feature points of a facial part are the right eye and the left eye. In yet another example, whether the user U is located within the first captured image acquiring region may be determined by detecting a person region from an overlooking image obtained by combining captured images from a plurality of onboard cameras provided in the vehicle V and based on the position of the person region. In another example, whether the user U is located within the first captured image acquiring region may be determined based on whether a sensor, such as a range finding sensor, has detected the presence of a person in the first captured image acquiring region. In this manner, keeping the process by the first authentication unit 103 from starting until the first captured image acquiring condition is satisfied can reduce the power consumption.

Meanwhile, if the doors of the vehicle V are in an unlocked state and if a predetermined second captured image acquiring condition is satisfied, the acquiring unit 102 may supply, as a second captured image, a captured image acquired from the periphery camera 120 or from the in-vehicle camera 122 to the gesture determining unit 106. The second captured image acquiring condition may also be referred to as a gesture determination starting condition. A second captured image acquiring condition may be that the user U included in a captured image captured by the periphery camera 120 or by the in-vehicle camera 122 is located within a region (a second captured image acquiring region) set in advance with the vehicle V serving as a reference. The second captured image acquiring region may be a region different from or the same as the first captured image acquiring region. Description of the determination as to whether the user U is located within the second captured image acquiring region will be omitted, with "the periphery camera 120" in the description above replaced with "the periphery camera 120 or the in-vehicle camera 122" and with "the first captured image acquiring region" in the description above replaced with "the second captured image acquiring region."

Herein, if the user U is located within the second captured image acquiring region, the acquiring unit 102 may immediately determine that the second captured image acquiring condition is satisfied and may supply the captured image to the gesture determining unit 106 as a second captured image. Alternatively, the acquiring unit 102 may supply a captured image to the gesture determining unit 106 as a second captured image after the acquiring unit 102 has determined that the user U has stayed in the second captured image acquiring region for a predetermined length of time or longer. In other words, the second captured image acquiring condition may be that the user U included in the captured image stays in the second captured image acquiring region for a predetermined length of time or longer. In this case, the second captured image acquiring condition may be, for example, that the user U included in the captured image stops in the second captured image acquiring region for a few seconds or longer or sits in the driver's seat for a few seconds or longer. In this manner, keeping a gesture determination from starting until the second captured image acquiring condition is satisfied can reduce the power consumption.

The first authentication unit 103 is one example of the first authentication unit 13 described above. The first authentication unit 103 causes the face authentication apparatus 2 to execute face authentication of a person (a user U) included in a first captured image and, based on the face authentication result, determines whether the person included in the first captured image is a registered Specifically, the first authentication unit 103 transmits a face user. authentication request including a first captured image to the face authentication apparatus 2 via the network N. The first authentication unit 103 then receives a face authentication result from the face authentication apparatus 2 via the network N. The first authentication unit 103 then determines whether the user ID included in the face authentication result is included in the user information stored in the storage unit 108. If the user ID included in the face authentication result is included in the user information, the first authentication unit 103 determines that the person included in the first captured image is a registered user. The first authentication unit 103 then supplies the registered user determination result to the first vehicle controlling unit 104. Herein, the process performed by the first authentication unit 103 may be referred to as a first authentication process.

The first vehicle controlling unit 104 is one example of the first vehicle controlling unit 14 described above. The first vehicle controlling unit 104 is connected to the first actuator 130. If a person included in a first captured image is determined to be a registered user, the first vehicle controlling unit 104 transmits, to the first actuator 130, a first control signal for executing first control related to the unlocking of an opening and closing body of the vehicle V.

Meanwhile, if an opening and closing body of the vehicle V is in an unlocked state and in a closed state and if a predetermined length of time has passed after the opening and closing body has entered the closed state, the first vehicle controlling unit 104 transmits, to the first actuator 130, a third control signal for executing third control related to the locking of the opening and closing body of the vehicle V. With this configuration, the opening and closing body of the vehicle V is locked automatically without the use of an electronic key, and thus the security level and the user-friendliness improve.

The gesture determining unit 106 is one example of the gesture determining unit 16 described above. The gesture determining unit 106 acquires a second captured image from the acquiring unit 102. Based on the second captured image, the gesture determining unit 106 then executes a gesture determination of whether a gesture of a person (a user U) included in the second captured image is a registered gesture. Specifically, the gesture determining unit 106 generates, from the second captured image, gesture information for authentication that indicates the feature values of the gesture. Then, the gesture determining unit 106, referring to the gesture table stored in the storage unit 108, determines whether the gesture information for authentication matches gesture information for registration indicating the feature values of the registered gesture registered in the gesture table. That the gesture information for authentication matches the gesture information for registration may mean that the degree of similarity between the feature values is no lower than a predetermined threshold. Herein, the gesture determining unit 106 executes the series of processes from the generation of gesture information for authentication to the gesture determination with the use of a gesture determining model. The gesture determining model is a determining device trained with the registered gestures registered in the gesture table. For example, the gesture determining model, upon receiving input of a second captured image, may output the degree of similarity between the gesture information for authentication and the gesture information for registration. In this case, the gesture determining model may include a convolutional neural network (CNN). If the gesture information for authentication matches the gesture information for registration, the gesture determining unit 106 informs the second vehicle controlling unit 107 of the gesture type.

The second vehicle controlling unit 107 is one example of the second vehicle controlling unit 17 described above. The second vehicle controlling unit 107 is connected to the second actuator 140-1 and to the second actuator 140-5. If the gesture of the user U included in a second captured image is a registered gesture, the second vehicle controlling unit 107 transmits a second control signal and executes second control set in accordance with the gesture of the user U. The second control signal is transmitted to either the second actuator 140-1 or the second actuator 140-5, and to which of the two the second control signal is transmitted is determined in accordance with the gesture of the user U.

The storage unit 108 is a storage device that stores information necessary for information processing by the information processing apparatus 100, that is, information necessary for a registration process and a control process. The storage unit 108 stores at least the user information, the gesture table, and a gesture determining model corresponding to the registered gesture.

The first actuator 130 is an actuator that produces an actuating force for unlocking and locking an opening and closing body of the vehicle V. The second actuator 140-1 is an actuator that produces an actuating force for opening and closing an opening and closing body of the vehicle V. The second actuator 140-5 is a switch for starting and stopping a power source of the vehicle V.

Figure 11:
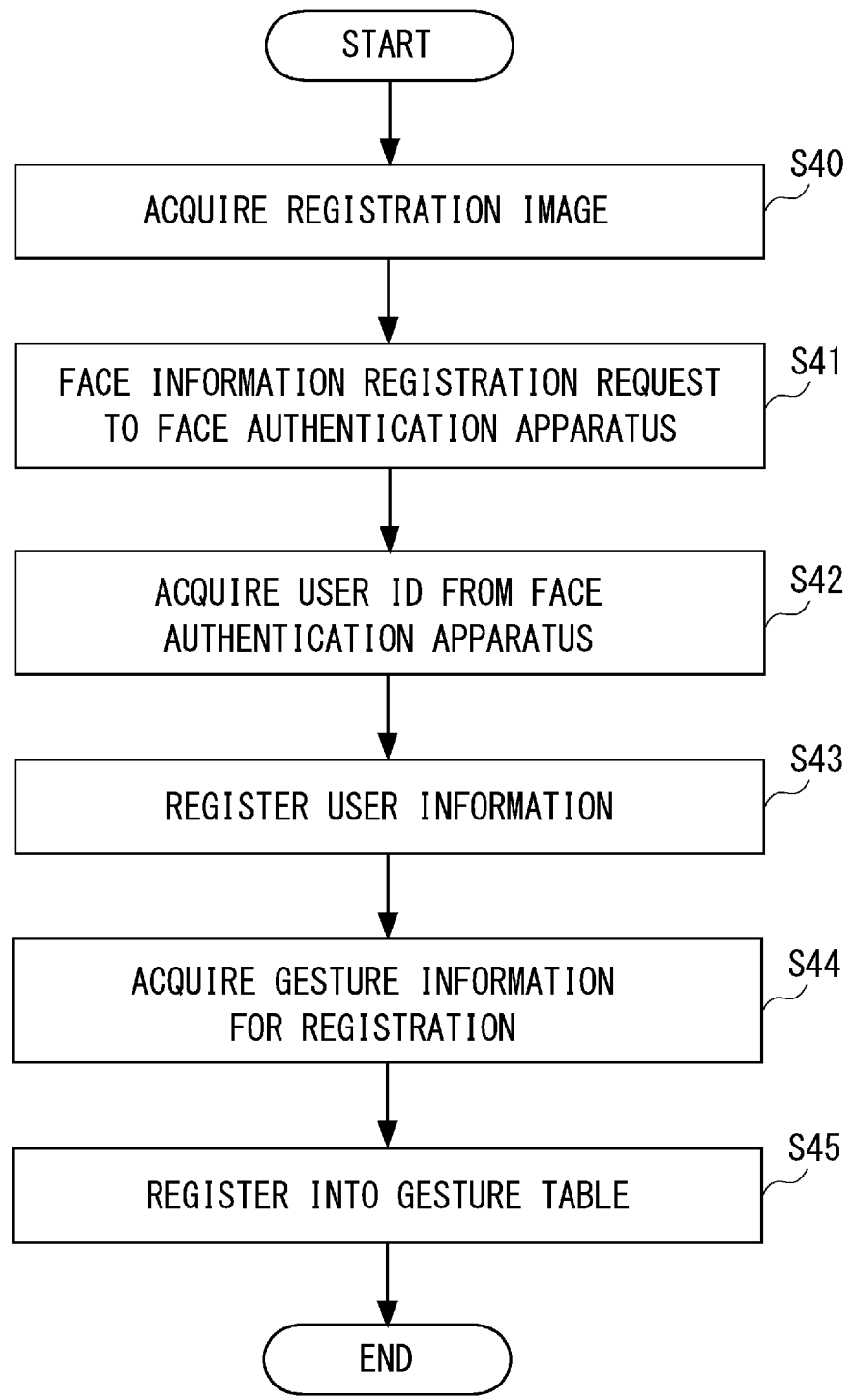
FIG. 11 is a flowchart showing a flow of a registration process according to the second example embodiment.

FIG. 11 is a flowchart showing a flow of a registration process according to the second example embodiment. First, the registering unit 101 of the information processing apparatus 100 acquires a registration image of a user U (S40). At this point, the registering unit 101 may acquire the registration image from the periphery camera 120 or from the in-vehicle camera 122 or may acquire the registration image from a user terminal (not illustrated) used by the user U via the network N. Next, the registering unit 101, via the network N, requests the face authentication apparatus 2 to register face information into the face information DB 210 (S41). The face information registration request includes the registration image. Next, the registering unit 101 acquires the user ID from the face authentication apparatus 2 via the network N (S42). Next, the registering unit 101 registers the user ID as user information (S43).

Next, the registering unit 101 acquires gesture information for registration (S44) and registers the gesture information for registration into the gesture table (S45). The gesture information for registration includes the content of the second control and the content of the registered gesture. The registering unit 101 may acquire the content of the second control and the content of the registered gesture through an input that the user U of the vehicle V provides via an input unit. Specifically, the user U first inputs a second control target and a second control type and sets the content of the second control. For example, the user U may set the content of the second control by selecting one or more sets of a second control target and second control type from a list of second control targets and second control types set in advance. The user U then inputs a gesture target and a gesture type to set the content of the registered gesture corresponding to the set content of the second control. For example, the user U may set the content of the registered gesture by selecting a set of a gesture target and gesture type from a list of gesture targets and gesture types set in advance. Alternatively, the user U may set the content of the registered gesture by selecting a plurality of sets of a gesture target and gesture type from a list of gesture targets and gesture types set in advance and by freely combining a gesture target and a gesture type. The registering unit 101 then registers, into the gesture table, the gesture information for registration, or specifically, information linking the content of the registered gesture set based on the input provided by the user U via the input unit and the content of the second control. Herein, the registering unit 101 may identify the content of the registered gesture based on moving image data capturing the registered user executing the registered gesture and register the identified content of the registered gesture into the gesture table with that content linked to the content of the second control. Herein, if the gesture table is set in advance, the processes at steps S44 and S45 may be omitted.

Figure 12:
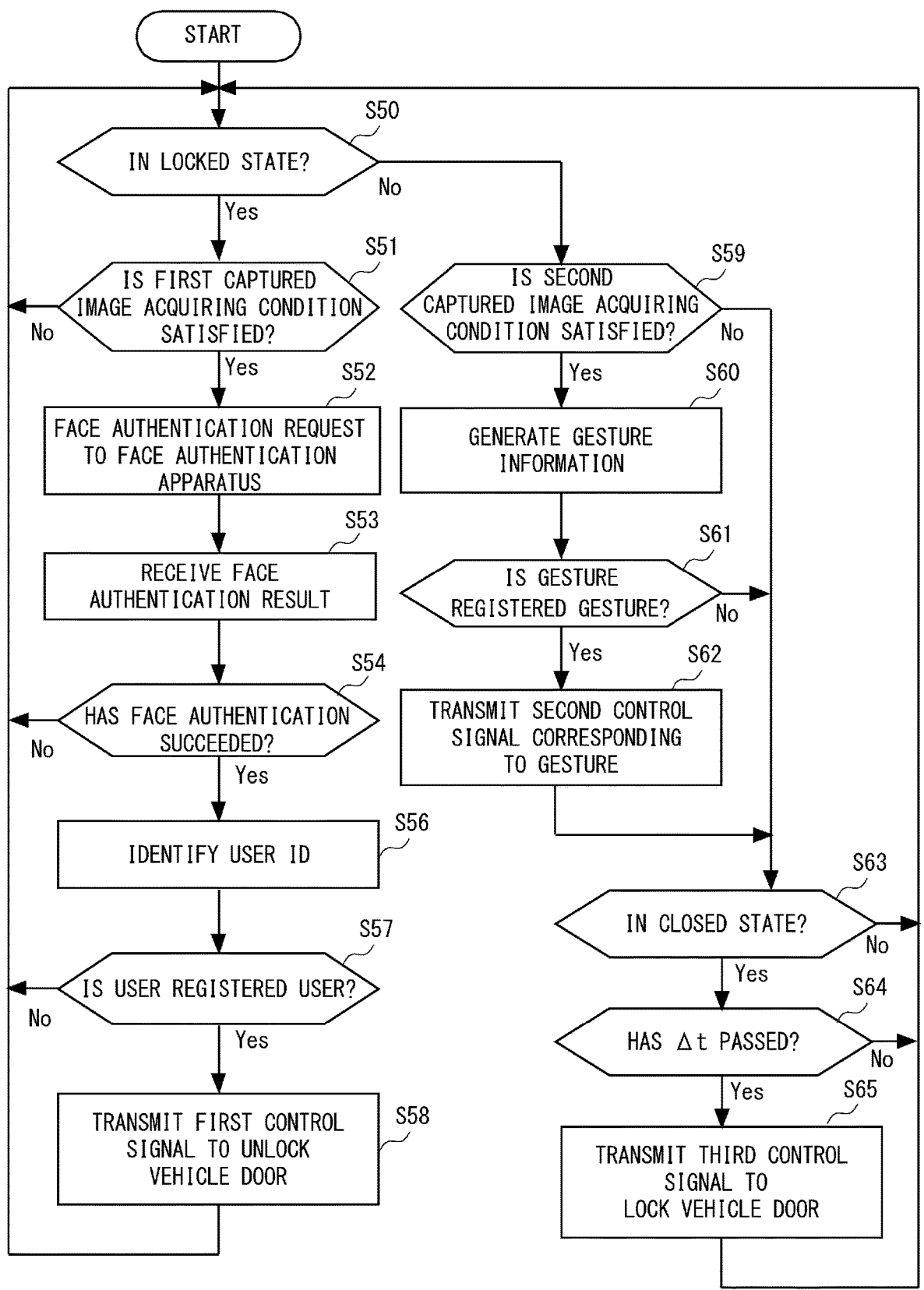
FIG. 12 is a flowchart showing a flow of a control process according to the second example embodiment.

FIG. 12 is a flowchart showing a flow of a control process according to the second example embodiment. First, the information processing apparatus 100 determines whether the doors of the vehicle V are in a locked state (S50). Here, the information processing apparatus 100 may determine whether the doors of the vehicle V are in a locked state by, for example, monitoring the state of the first actuator 130 in the first vehicle controlling unit 104. If the doors of the vehicle V are in a locked state (Yes at S50), the acquiring unit 102 determines whether the first captured image acquiring condition described above is satisfied (S51). If the first captured image acquiring condition is not satisfied (No at S51), the acquiring unit 102 returns the process to step S50. Meanwhile, if the first captured image acquiring condition is satisfied (Yes at S51), the acquiring unit 102 supplies a captured image acquired from the periphery camera 120 to the first authentication unit 103 as a first captured image and moves the process to step S52. At step S52, the first authentication unit 103 transmits a face authentication request to the face authentication apparatus 2 via the network N. At this point, the first authentication unit 103 incorporates, into the face authentication request, at least any one of the first captured image, a face region extracted from the first captured image, or facial feature information extracted from such a face region. The first authentication unit 103 then receives a face authentication result from the face authentication apparatus 2 via the network N (S53). The face authentication result includes information indicating the success of the face authentication and a user ID if the face authentication has succeeded or includes information indicating the failure of the face authentication if the face authentication has failed.

Next, the first authentication unit 103 determines whether the face authentication has succeeded (S54). If the face authentication has failed to succeed (No at S54), the first authentication unit 103 returns the process to step S50. Meanwhile, if the face authentication has succeeded (Yes at S54), the first authentication unit 103 identifies the user ID of the user whose face authentication has succeeded (S56) and moves the process to step S57. Specifically, the first authentication unit 103 extracts the user ID included in the face authentication result. At step S57, the first authentication unit 103 determines whether the user U whose face authentication has succeeded is a registered user by determining whether the identified user ID is included in the user information stored in the storage unit 108 (S57). If the user U whose face authentication has succeeded is not a registered user (No at S57), the first authentication unit 103 returns the process to step S50. Meanwhile, if the user U whose face authentication has succeeded is a registered user (Yes at S57), the first vehicle controlling unit 104 transmits a first control signal for unlocking a door of the vehicle V to the first actuator 130 (S58).

Meanwhile, if the doors of the vehicle V are not in a locked state, that is, if the doors are in an unlocked state (No at S50), the acquiring unit 102 determines whether the second captured image acquiring condition described above is satisfied (S59). If the second captured image acquiring condition is not satisfied (No at S59), the acquiring unit 102 moves the process to step S63. Meanwhile, if the second captured image acquiring condition is satisfied (Yes at S59), the acquiring unit 102 supplies a captured image acquired from the periphery camera 120 or from the in-vehicle camera 122 to the gesture determining unit 106 as a second captured image and moves the process to step S60. At step S60, the gesture determining unit 106 detects a person region or a face region included in the second captured image and, based on the person region or the face region, generates gesture information for authentication of the user U included in the second captured image (S60). Next, the gesture determining unit 106 determines whether the gesture of the user U is a registered gesture by determining whether the gesture information for authentication of the user U matches the gesture information for registration of the registered gesture registered in the gesture table (S61). If the gesture of the user U is not a registered gesture (No at S61), the gesture determining unit 106 moves the process to step S63. Meanwhile, if the gesture of the user U is a registered gesture (Yes at S61), the gesture determining unit 106 moves the process to step S62. At step S62, the second vehicle controlling unit 107 generates a second control signal corresponding to the gesture of the user U (i.e., the matched registered gesture) and transmits the second control signal to a second actuator 140. Specifically, the second vehicle controlling unit 107 identifies the second control target and the second control type corresponding to the registered gesture with the use of the gesture table and generates a second control signal based on the second control target and the second control type. The second vehicle controlling unit 107 then transmits the second control signal to the second actuator 140 corresponding to the second control target. The second vehicle controlling unit 107 then moves the process to step S63.

At step S63, the information processing apparatus 100 determines whether the doors of the vehicle V are in a closed state. Herein, the information processing apparatus 100 may determine whether the doors of the vehicle V are in a closed state by, for example, monitoring the state of the second actuator 140-1 in the second vehicle controlling unit 107. If the doors of the vehicle V are not in a closed state, that is, if the doors are in an open state (No at S63), the information processing apparatus 100 returns the process to step S50. Meanwhile, if the doors of the vehicle V are in a closed state (Yes at S63), the information processing apparatus 100 determines whether a predetermined length of time Δt has passed after the doors have entered a closed state (S64). If the predetermined length of time Δt has not passed (No at S64), the information processing apparatus 100 returns the process to step S50. Meanwhile, if the predetermined length of time Δt has passed (Yes at S64), the first vehicle controlling unit 104 transmits a third control signal for locking the doors of the vehicle V to the first actuator 130 (S65) and returns the process to step S50.

Figure 13:
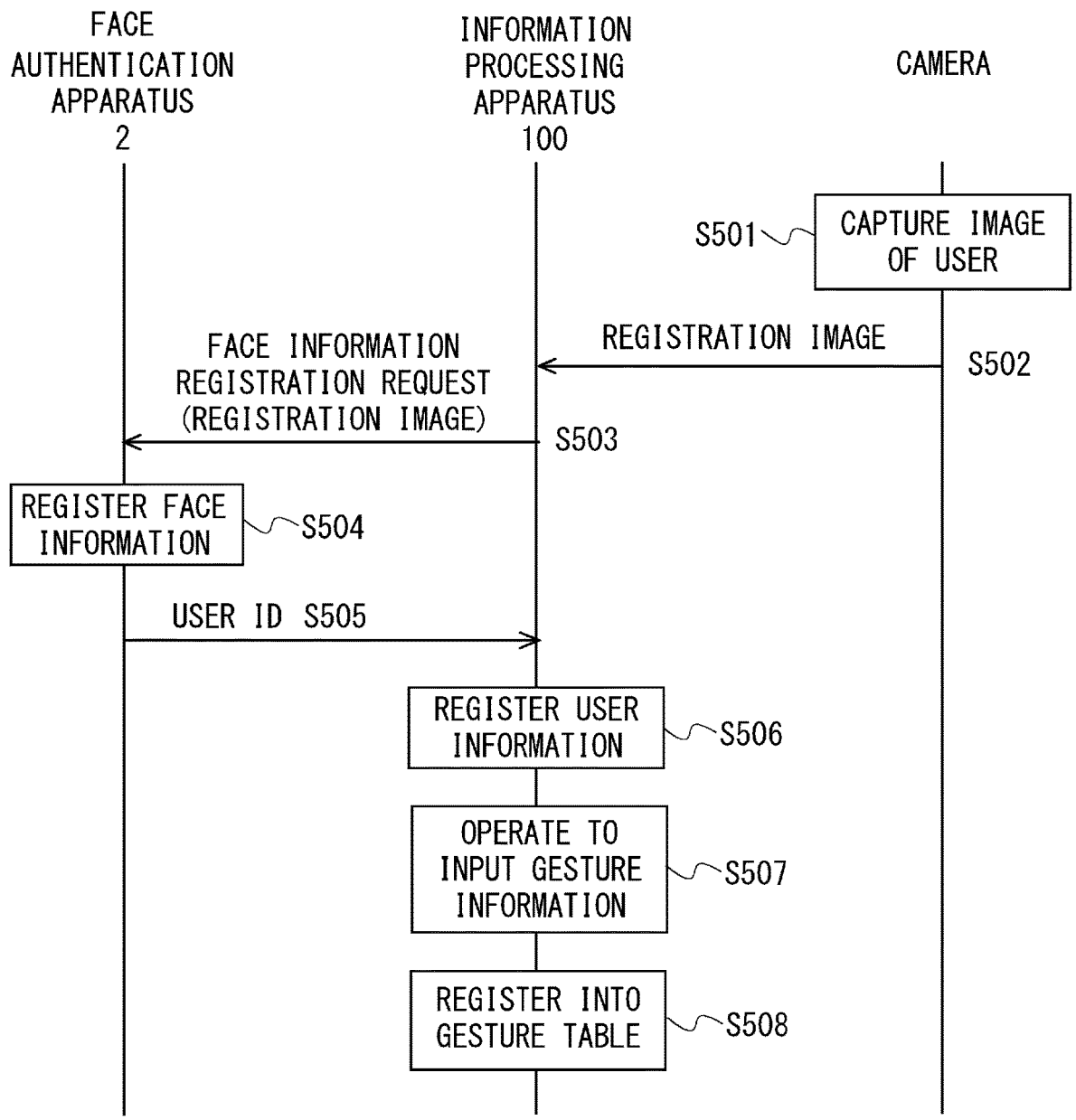
FIG. 13 is a sequence diagram showing one example of a flow of a registration process according to the second example embodiment.

FIG. 13 is a sequence diagram showing one example of a flow of a registration process according to the second example embodiment. First, a camera captures an image of a user U (S501) and transmits the captured image to the information processing apparatus 100 as a registration image (S502). Here, the camera that captures an image of the user U may be the periphery camera 120 or may be the in-vehicle camera 122. Alternatively, a camera (not illustrated) of a user terminal may capture an image of the user U, and the user terminal may transmit the captured image to the information processing apparatus 100 via the network N. Next, the information processing apparatus 100 transmits a face information registration request including the registration image to the face authentication apparatus 2 via the network N (S503). Then, the face authentication apparatus 2 registers face information (facial feature information) of the user U based on the registration image included in the received face information registration request (S504). The face authentication apparatus 2 then sends a user ID to the information processing apparatus 100 via the network N (S505). The information processing apparatus 100 registers the received user ID as user information (S506). The information processing apparatus 100 then receives an input operation of gesture information for registration from a registered user (S507). The information processing apparatus 100 then registers, into the gesture table, the received gesture information for registration, or specifically, information linking the content of a registered gesture and the content of second control (S508).

Figure 14:
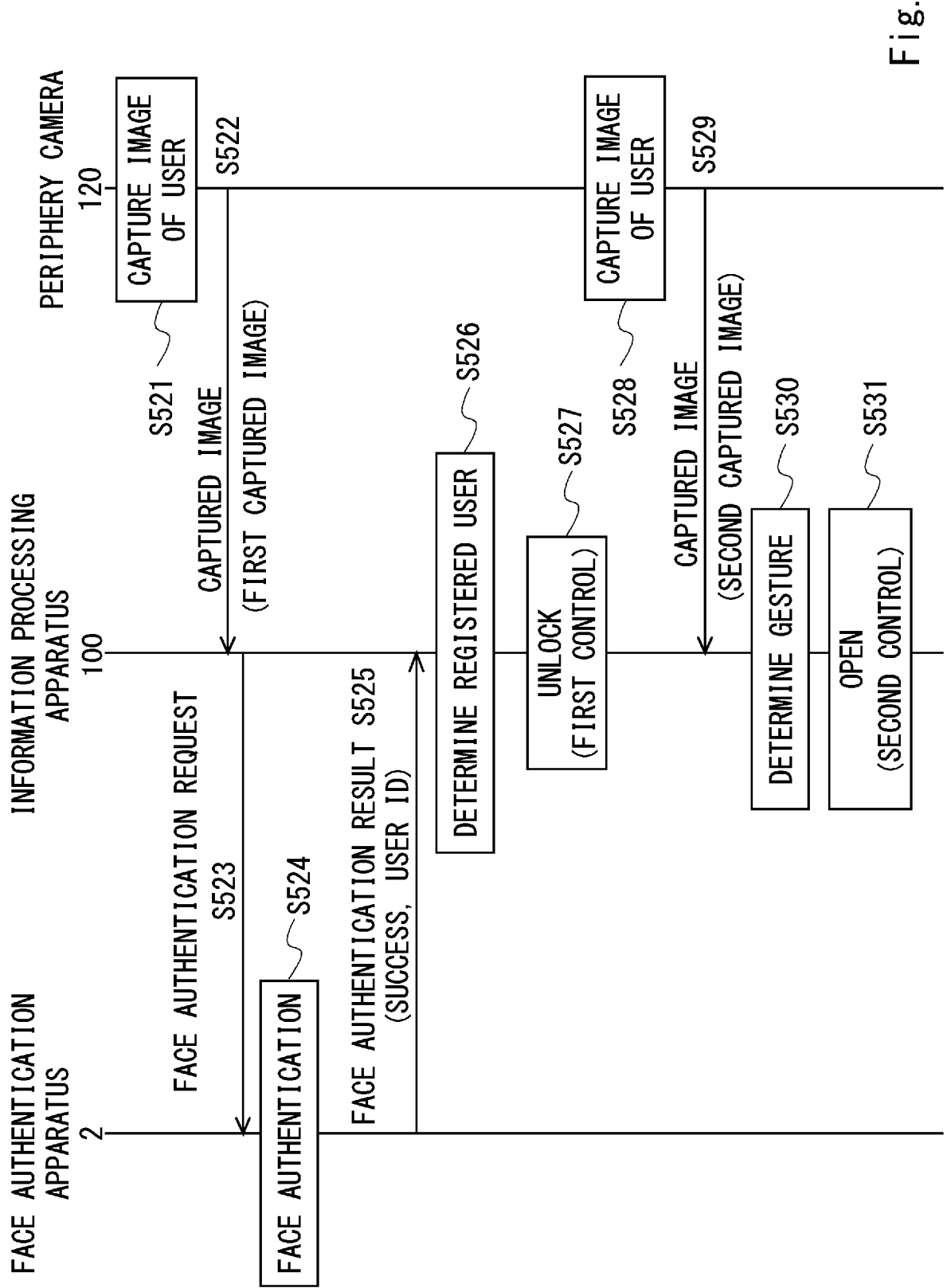
FIG. 14 is a sequence diagram showing one example of a flow of a control process according to the second example embodiment.

FIG. 14 is a sequence diagram showing one example of a flow of a control process according to the second example embodiment. This figure shows a control process performed when a user U gets in the vehicle V.

First, the periphery camera 120 captures an image of a user U (S521) and transmits the captured image to the information processing apparatus 100 via the network N (S522). Here, the first captured image acquiring condition is supposedly satisfied. In this case, the captured image that the information processing apparatus 100 has received is identified as a first captured image. Next, the information processing apparatus 100 transmits a face authentication request of the face region of the user U captured in the received captured image to the face authentication apparatus 2 via the network N (S523). Then, the face authentication apparatus 2 performs face authentication of the face region of the user U captured in the first captured image included in the received face authentication request (S524). Here, the face authentication has supposedly succeeded. The face authentication apparatus 2 transmits the face authentication result including information that the face authentication has succeeded and the user ID to the information processing apparatus 100 via the network N (S525).

In response to receiving the face authentication result, the information processing apparatus 100 compares the user ID included in the face authentication result against the user information to determine whether the user U included in the first captured image is a registered user (S526). The information processing apparatus 100 then transmits, to the first actuator 130, a first control signal for unlocking a door of the vehicle V as first control (S527). Thus, a door of the vehicle V enters an unlocked state.

Then, the periphery camera 120 captures an image of the user U (S528) and transmits the captured image to the information processing apparatus 100 via the network N (S529). Here, the second captured image acquiring condition is supposedly satisfied. In this case, the captured image that the information processing apparatus 100 has received is identified as a second captured image. Based on the second captured image, the gesture determining unit 106 of the information processing apparatus 100 then executes a gesture determination of whether a gesture of the user U included in the second captured image is a registered gesture (S530). Here, the user U has supposedly made a gesture of moving the direction of his or her face from right to left. In this case, the information processing apparatus 100, referring to the gesture table, determines that the gesture of the user U matches the gesture ID "G1." The information processing apparatus 100 then transmits, to the second actuator 140-1, a second control signal for opening the door of the vehicle V as second control (S531). Thus, the door of the vehicle V enters an open state.

Herein, at step S530, the information processing apparatus 100 executes a gesture determination based on the second captured image. Alternatively, the information processing apparatus 100 may identify a first captured image or a frame of a predetermined duration including the timing of capturing a first captured image as a second captured image and may execute a gesture determination based on this second captured image. In this case, steps S528 and S529 may be omitted.

Figure 15:
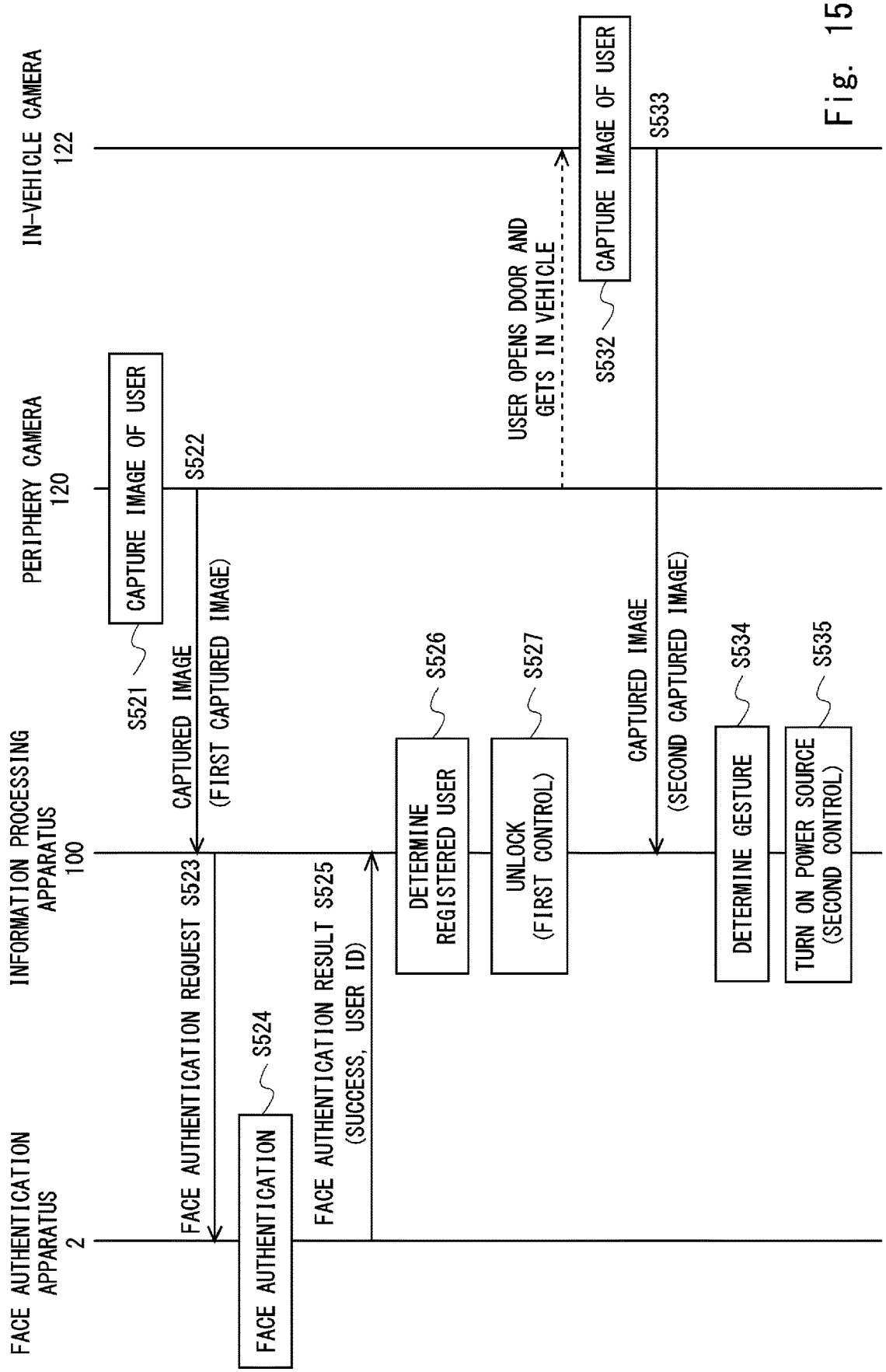
FIG. 15 is a sequence diagram showing another example of a flow of a control process according to the second example embodiment.

FIG. 15 is a sequence diagram showing another example of a flow of a control process according to the second example embodiment. This figure as well shows a control process performed when a user U gets in the vehicle V. First, processes similar to those performed at steps S521 to S527 of FIG. 14 are executed. Then, the user U opens the door and gets in the vehicle V. In other words, the user U moves into the vehicle V from the outside of the vehicle V. Here, the in-vehicle camera 122 captures an image of the user U (S532) and transmits the captured image to the information processing apparatus 100 via the network N (S533). Here, the second captured image acquiring condition is supposedly satisfied. In this case, the captured image that the information processing apparatus 100 has received is identified as a second captured image. Based on the second captured image, the information processing apparatus 100 then executes a gesture determination of whether a gesture of the user U included in the second captured image is a registered gesture (S534). Here, the user U has supposedly made a gesture of moving the direction of his or her gaze from down to up. In this case, the information processing apparatus 100, referring to the gesture table, determines that the gesture of the user U matches the gesture ID "G3." The information processing apparatus 100 then transmits, to the second actuator 140-5, a second control signal for starting the IG power source of the vehicle V as second control (S535). Thus, the IG power source of the vehicle V enters an on state.

The processes at step S532 and thereafter may be performed after step S531 of FIG. 14.

In this manner, according to the second example embodiment, the information processing apparatus 100 executes control of unlocking a door of the vehicle V by biometric authentication and executes control other than the unlocking of the vehicle V and requiring an intention of the user U by a gesture determination. With this configuration, the user U can, without using an electronic key, unlock a vehicle door and also perform other operations related to the vehicle as intended. Furthermore, the user U can execute only the unlocking. Accordingly, the configuration above can provide advantageous effects similar to those provided by the first example embodiment, and user-friendliness in operating the vehicle improves.

Third Example Embodiment

Next, a third example embodiment of the present disclosure will be described. One of the features of the third example embodiment is that the content of a registered gesture on which a gesture determination is to be made or the content of second control may differ depending on the position of the user.

Figure 16:
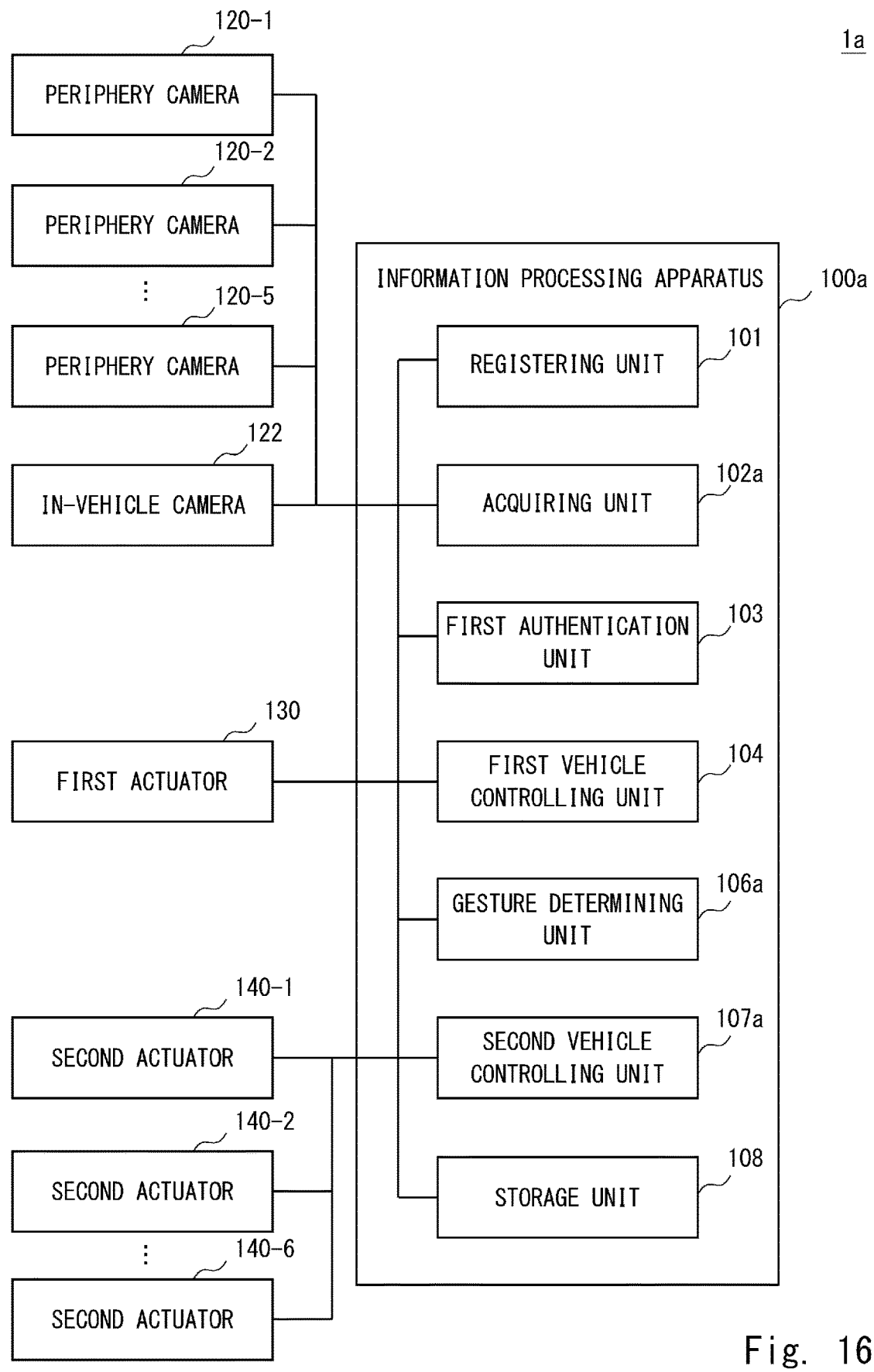
FIG. 16 is a block diagram showing a configuration of an in-vehicle system according to a third example embodiment.

FIG. 16 is a block diagram showing a configuration of an in-vehicle system 1a according to the third example embodiment. The in-vehicle system 1a differs from the in-vehicle system 1 in that the in-vehicle system 1a includes, in place of the periphery camera 120, the second actuators 140-1 and 140-5, and the information processing apparatus 100, periphery cameras 120-1 to 120-5, second actuators 140-1 to 140-6, and an information processing apparatus 100a. Herein, the number of periphery cameras 120 and the number of second actuators 140 are not limited to the numbers indicated above.

The periphery cameras 120-1 to 120-5 are periphery cameras 120 provided at different positions on a vehicle V. For example, the periphery cameras 120-1, 120-2, 120-3, 120-4, and 120-5 are cameras that capture scenes in, respectively, the front left, the left side, the front right, the right side, and the rear of the vehicle V. The periphery cameras 120-1 to 120-5 are connected to an acquiring unit 102a described later.

The second actuators 140-1, 140-2, 140-3, and 140-4 are actuators that produce an actuating force for opening and closing various opening and closing bodies of the vehicle V. In one example, the second actuators 140-1, 140-2, 140-3, and 140-4 are actuators that produce an actuating force for opening and closing, respectively, the doors, the hood, the fuel tank cover, and the trunk cover of the vehicle V.

The second actuators 140-5 and 140-6 are switches for starting and stopping various power sources of the vehicle V. In one example, the second actuators 140-5 and 140-6 are switches for starting and stopping, respectively, the IG power source and the ACC power source of the vehicle V.

The second actuators 140-1 to 140-6 are connected to a second vehicle controlling unit 107a described later.

The information processing apparatus 100a includes, in place of the acquiring unit 102, the gesture determining unit 106, and the second vehicle controlling unit 107, an acquiring unit 102a, a gesture determining unit 106a, and a second vehicle controlling unit 107a.

The acquiring unit 102a has functions basically similar to the functions of the acquiring unit 102. However, the acquiring unit 102a differs from the acquiring unit 102 in that the acquiring unit 102a identifies a second captured image from captured imaged acquired from the periphery cameras 120-1 to 120-5 and the in-vehicle camera 122 and identifies a user position served by a region in which the user U included in the second captured image is located. The user position is identified based on the result of "the determination as to whether the user U is located within the second captured image acquiring region" in the determination of the second captured image acquiring condition described above according to the second example embodiment.

Figure 17:
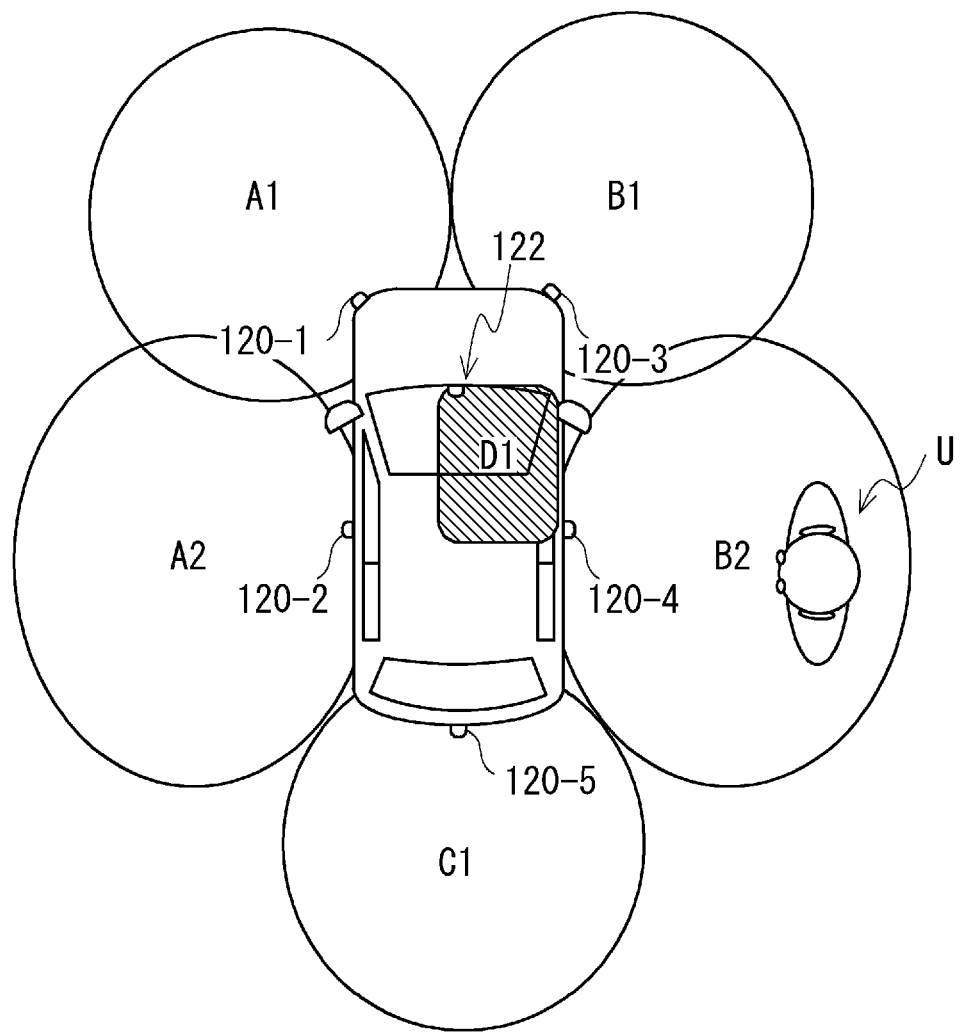
FIG. 17 shows one example of a user position according to the third example embodiment.

Here, each camera may have a different second captured image acquiring region serving as a second captured image acquiring condition. FIG. 17 shows one example of a user position according to the third example embodiment. The second captured image acquiring regions of the periphery cameras 120-1, 120-2, 120-3, 120-4, and 120-5 are, respectively, regions A1, A2, B1, B2, and C1. The second captured image acquiring region of the in-vehicle camera 122 is a region D1. The regions A1, A2, B1, B2, C1, and D1 are set in advance with the vehicle V serving as a reference. The acquiring unit 102a identifies a second captured image if the acquiring unit 102a has determined that the user U is located in any one of the regions A1, A2, B1, B2, C1, and D1, and supplies the second captured image and the user position to the gesture determining unit 106a.

For example, the acquiring unit 102a identifies, of the captured images acquired from the periphery cameras 120-1 to 120-5 and from the in-vehicle camera 122, a captured image in which the size or the width or length of the face region of the user U is no less than a predetermined number of pixels as a second captured image. In another example, the acquiring unit 102a identifies a captured image in which the length connecting feature points of a predetermined facial part included in the face region of the user U is no less than a predetermined number of pixels as a second captured image. The acquiring unit 102a then identifies the camera that has captured the second captured image and identifies the second captured image acquiring region corresponding to this camera as the region in which the user is located (the user position). In the case of FIG. 17, the acquiring unit 102a identifies the periphery camera 120-4 as the camera that has captured the second captured image and identifies the region B2 as the user position.

Figure 18:
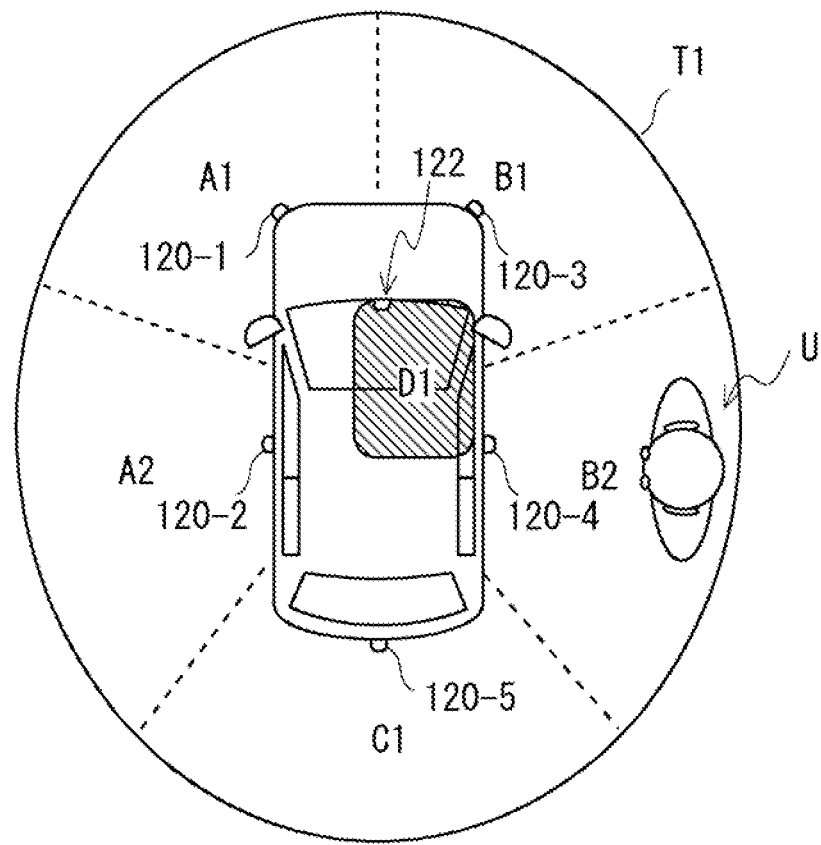
FIG. 18 shows another example of a user position according to the third example embodiment.

FIG. 18 shows another example of a user position according to the third example embodiment. The second captured image acquiring region is a region T1 and a region D1. The region T1 includes regions A1, A2, B1, B2, and C1 corresponding to, respectively, the periphery cameras 120-1, 120-2, 120-3, 120-4, and 120-5. The regions A1, A2, B1, B2, C1, and D1 in FIG. 18 as well are set in advance with the vehicle V serving as a reference.

For example, the acquiring unit 102a combines captured images acquired from the periphery cameras 120-1, 120-2, 120-3, 120-4, and 120-5 and generates an overlooking image looking at the vehicle V from the above. The acquiring unit 102a then detects a person region from the overlooking image and, if this person region is located within the region T1, the acquiring unit 102a identifies the region that includes the position of the person region within the region T1 as the user position. Alternatively, an omnidirectional camera may be provided at a predetermined position of the vehicle V, and the acquiring unit 102a may use an image generated as the omnidirectional captures an image as an overlooking image. The acquiring unit 102a then identifies the camera that corresponds to the user position and identifies the captured image acquired from this camera as the second captured image. The acquiring unit 102a then supplies the second captured image and the user position to the gesture determining unit 106a. In the case of FIG. 18, the acquiring unit 102a identifies the region B2 as the user position and identifies the captured image captured by the periphery camera 120-4 corresponding to the region B2 as the second captured image.

Herein, in the example shown in FIG. 18, if the captured image acquired from the in-vehicle camera 122 satisfies the second captured image acquiring condition, the acquiring unit 102a may identify the second captured image and the user position through a method similar to the method shown in FIG. 17 and may supply the second captured image and the user position to the gesture determining unit 106a.

The description continues with reference back to FIG. 16. The gesture determining unit 106a has functions basically similar to the functions of the gesture determining unit 106 but controls a gesture determination corresponding to the user position with the use of the gesture table. To be more specific, the gesture determining unit 106a, with the use of the gesture table, determines whether the gesture of the user U included in the second captured image is a registered gesture corresponding to the region in which the user U is located.

The second vehicle controlling unit 107*a* has functions basically similar to the functions of the second vehicle controlling unit 107. However, the second vehicle controlling unit 107*a* differs from the second vehicle controlling unit 107 in that the second vehicle controlling unit 107*a* transmits a second control signal for executing second control corresponding to each gesture of a person included in a second captured image and to the region in which the person is located.

FIG. 19 shows one example of a data structure of a gesture table according to the third example embodiment. The content of a registered gesture in the gesture table is set according to each region set in advance with the vehicle V serving as a reference. For example, if the user position is the region C1, the content of the registered gesture includes the gesture IDs "G41" and "G42." In other words, the gesture determining unit 106*a* determines whether the gesture of the user U corresponds to either one of the gesture IDs "G41" and "G42." Meanwhile, if the user position is the region D1, the content of the registered gesture includes the gesture IDs "G11," "G12," "G21," and "G22." In other words, the gesture determining unit 106*a* determines whether the gesture of the user U corresponds to any one of the gesture IDs "G11," "G12," "G21," and "G22."

The content of the second control in the gesture table, that is, the second control target or the second control target type is also set according to each region set in advance with the vehicle V serving as a reference. For example, if the user position is the region A1 and the user U has made a gesture with the gesture ID "G11," the second vehicle controlling unit 107*a* transmits a second control signal for executing second control whose content is "opening a door." Meanwhile, even if the user U likewise has made a gesture with the gesture ID "G11," if the user position is the region D1, the second vehicle controlling unit 107*a* transmits a second control signal indicating second control whose content is "starting the ACC power source."

Figure 20:
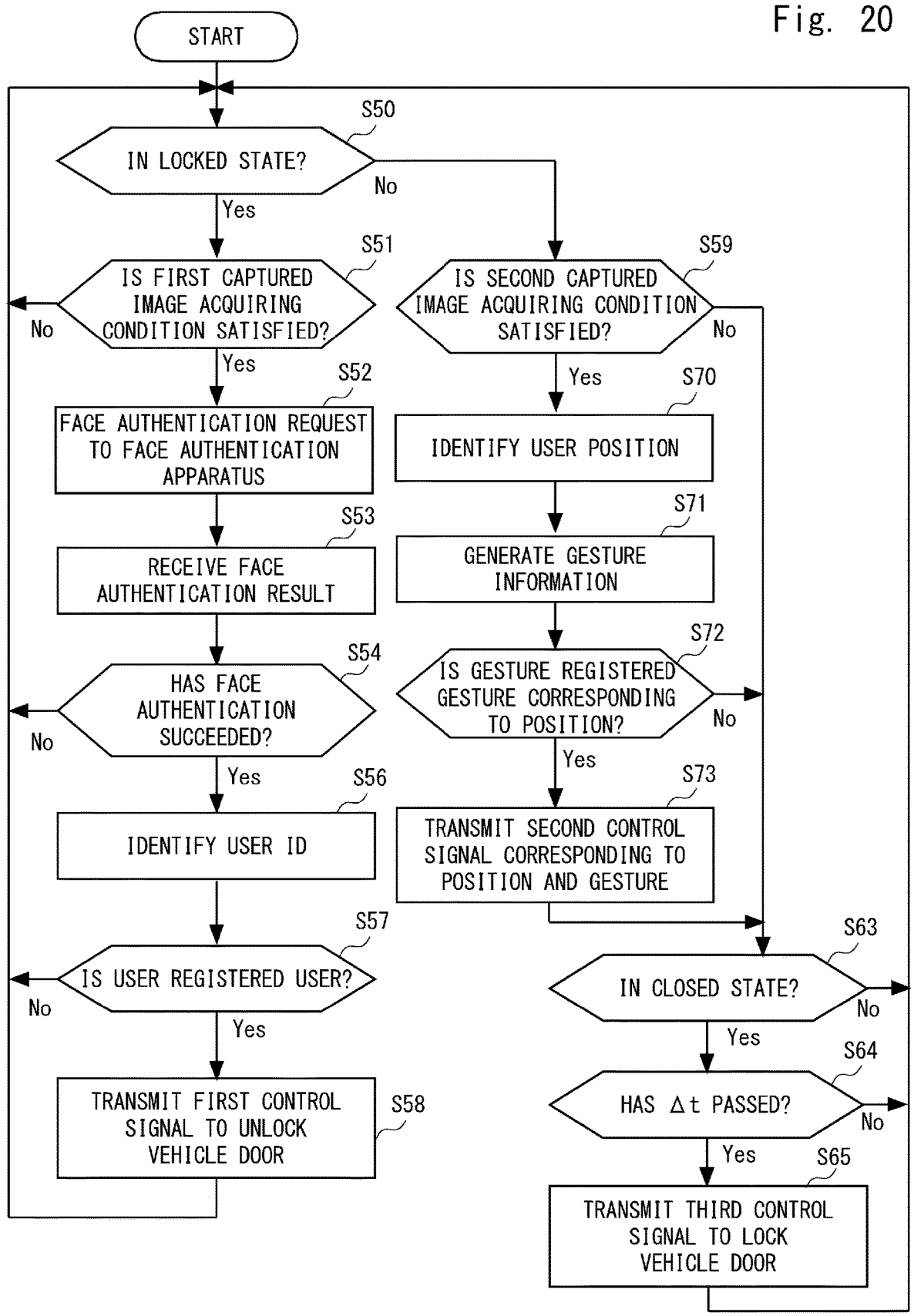
FIG. 20 is a flowchart showing one example of a flow of a control process according to the third example embodiment.

FIG. 20 is a flowchart showing one example of a flow of a control process according to the third example embodiment. The steps shown in FIG. 20 include, in place of steps S60 to S62 shown in FIG. 12, steps S70 to S73.

At step S59, if the second captured image acquiring condition is satisfied, the acquiring unit 102*a* identifies the camera that has captured the second captured image and identifies the second captured image acquiring region corresponding to this camera as the user position (S70). The acquiring unit 102*a* then supplies the second captured image and information indicating the user position to the gesture determining unit 106*a*. Next, the gesture determining unit 106*a* detects a person region or a face region included in the second captured image and, based on the person region or the face region, generates gesture information for authentication of the user U included in the second captured image (S71). Next, the gesture determining unit 106*a* determines whether the gesture of the user U is the registered gesture corresponding to the user position by determining whether the gesture information for authentication of the user U matches the gesture information for registration registered in the gesture table and for the registered gesture corresponding to the user position (S72). If the gesture of the user U is not the registered gesture corresponding to the user position (No at S72), the gesture determining unit 106*a* moves the process to step S63. Meanwhile, if the gesture of the user U is the registered gesture corresponding to the user position (Yes at S72), the gesture determining unit 106*a* moves the process to step S73. At step S73, the second vehicle controlling unit 107*a* generates a second control signal corresponding to the gesture of the user U (i.e., the matched registered gesture) and the user position and transmits the second control signal to a second actuator 140 (S73). Specifically, the second vehicle controlling unit 107*a* identifies the second control target and second control type corresponding to the registered gesture and the user position with the use of the gesture table and generates a second control signal based on the second control target and the second control type. The second vehicle controlling unit 107a then transmits the second control signal to the second actuator 140 corresponding to the second control target. The second vehicle controlling unit 107*a* then moves the process to step S63.

In this manner, the third example embodiment allows a user U to use different gestures for different operations depending on his or her position. Furthermore, the user U can vary the content of the second control for each region in which the user U is located. This configuration improves user-friendliness.

Fourth Example Embodiment

Next, a fourth example embodiment of the present disclosure will be described. One of the features of the fourth example embodiment is that an information processing apparatus starts a gesture determination in response to determining that a person included in a second captured image is a registered user by biometric authentication. In the fourth example embodiment as well, biometric authentication is face authentication, but this is not a limiting example.

Figure 21:
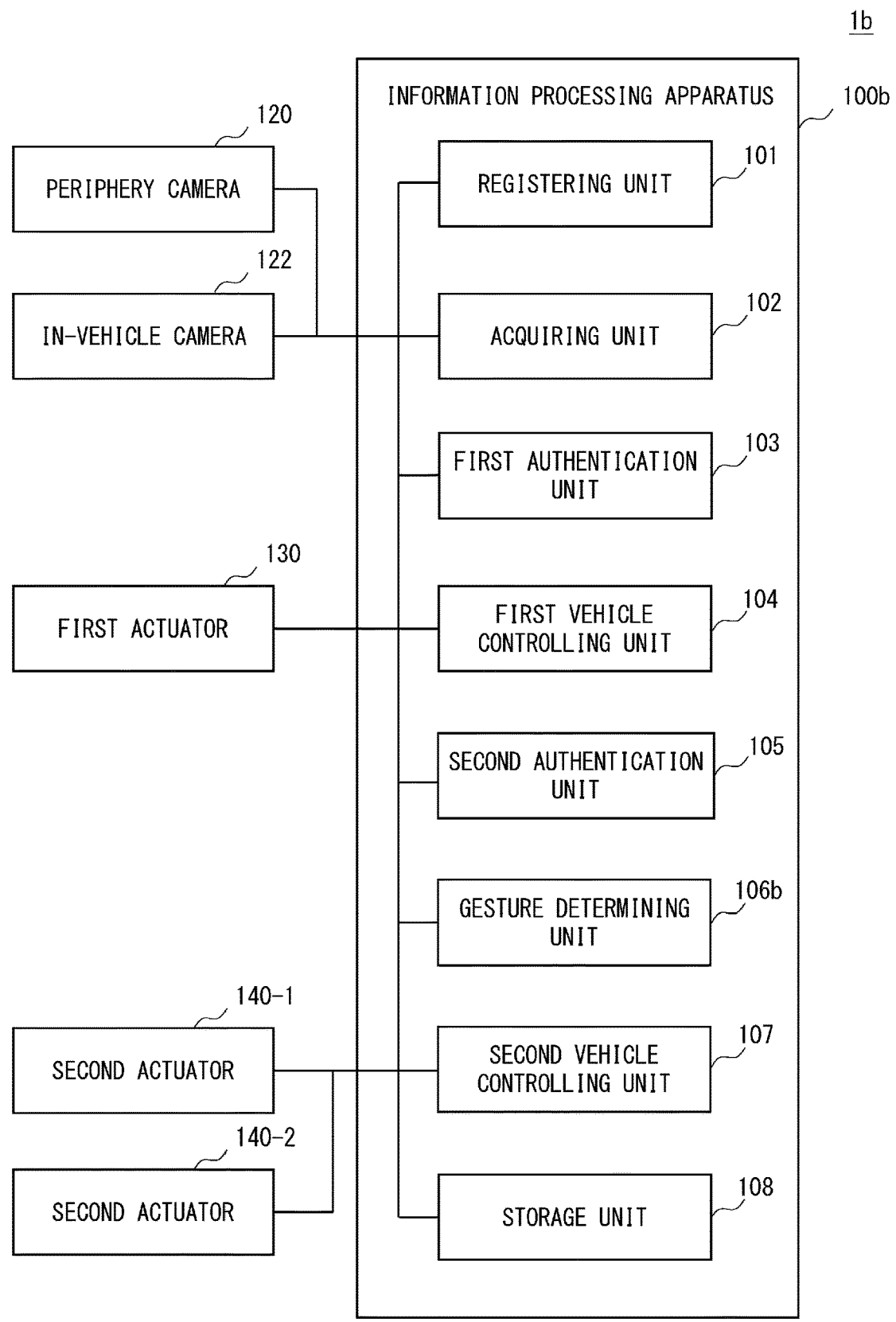
FIG. 21 is a block diagram showing a configuration of an in-vehicle system according to a fourth example embodiment.

FIG. 21 is a block diagram showing a configuration of an in-vehicle system 1*b* according to the fourth example embodiment. The in-vehicle system 1*b* has a configuration and functions basically similar to the configuration and functions of the in-vehicle system 1 according to the second example embodiment. However, the in-vehicle system 1*b* includes, in place of the information processing apparatus 100, an information processing apparatus 100*b*. The information processing apparatus 100*b* basically has a configuration similar to the configuration of the information processing apparatus 100, but the information processing apparatus 100*b* includes, in place of the gesture determining unit 106, a second authentication unit 105 and a gesture determining unit 106*b*.

The second authentication unit 105 is also referred to as a second authentication means. The second authentication unit 105, based on a second captured image supplied from the acquiring unit 102, controls face authentication of a person (a user U) included in the second captured image and determines whether the user U included in the second captured image is a registered user. The control performed by the second authentication unit 105 in the face authentication of the user U included in the second captured image is similar to the control performed by the first authentication unit 103 in the face authentication of the user U included in a first captured image. For example, the second authentication unit 105 causes the face authentication apparatus 2 to execute face authentication of the user U included in the second captured image and, based on the face authentication result, determines whether the person included in the second captured image is a registered user. The second authentication unit 105 then supplies the registered user determination result to the gesture determining unit 106*b*. Herein, the process performed by the second authentication unit 105 may be referred to as a second authentication process.

The gesture determining unit 106b basically has functions similar to the functions of the gesture determining unit 106. However, the gesture determining unit 106b executes a gesture determination if it is determined that a person included in a second captured image is a registered user.

Figure 22:
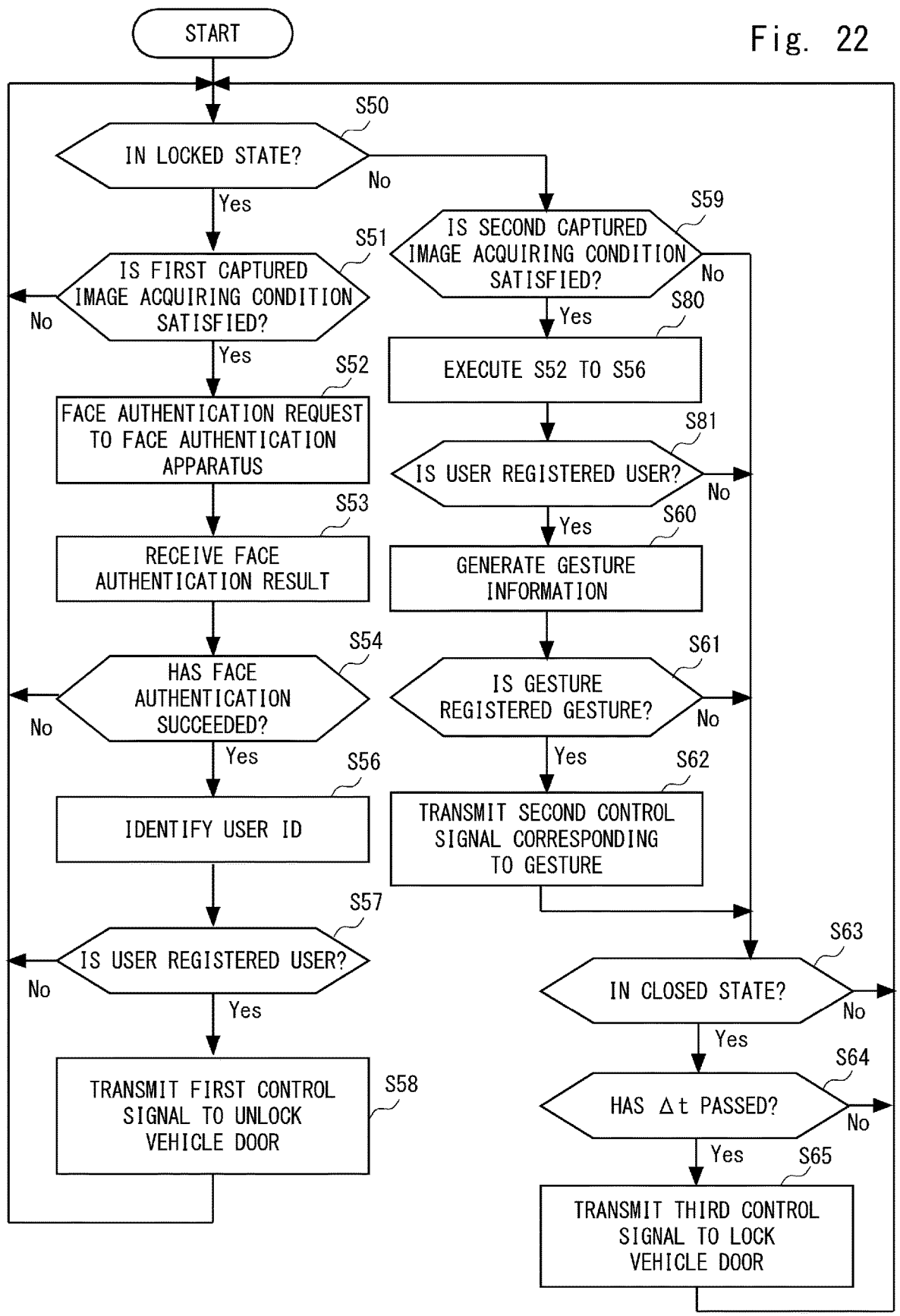
FIG. 22 is a flowchart showing one example of a flow of a control process according to the fourth example embodiment.

FIG. 22 is a flowchart showing one example of a flow of a control process according to the fourth example embodiment. The steps shown in FIG. 22 include, in addition to the steps shown in FIG. 12, steps S80 and S81.

At step S59, if the second captured image acquiring condition is satisfied, the acquiring unit 102 supplies the captured image acquired from the periphery camera 120 or from the in-vehicle camera 122 to the second authentication unit 105 as a second captured image and moves the process to step S80. At step S80, the second authentication unit 105 executes a process similar to the process shown at step S52 to S56 on the second captured image. The second authentication unit 105 then determines whether the user U whose face authentication has succeeded is a registered user by determining whether the identified user ID is included in the user information stored in the storage unit 108 (S81). If the user U whose face authentication has succeeded is not a registered user (No at S81), the second authentication unit 105 moves the process to step S63. Meanwhile, if the user U whose face authentication has succeeded is a registered user (Yes at S81), the gesture determining unit 106b executes a process shown at step S60 and generates gesture information for authentication of the user U included in the second captured image. The processes at step S61 and thereafter are similar to those shown in FIG. 12.

In this manner, according to the fourth example embodiment, the information processing apparatus 100b refrains from starting a gesture determination if biometric authentication that is based on a second captured image has failed, and this makes it possible to prevent second control from being executed in response to a gesture of a person other than a registered user. Therefore, the security can be enhanced, and power consumption can be reduced.

Fifth Example Embodiment

Figure 23:
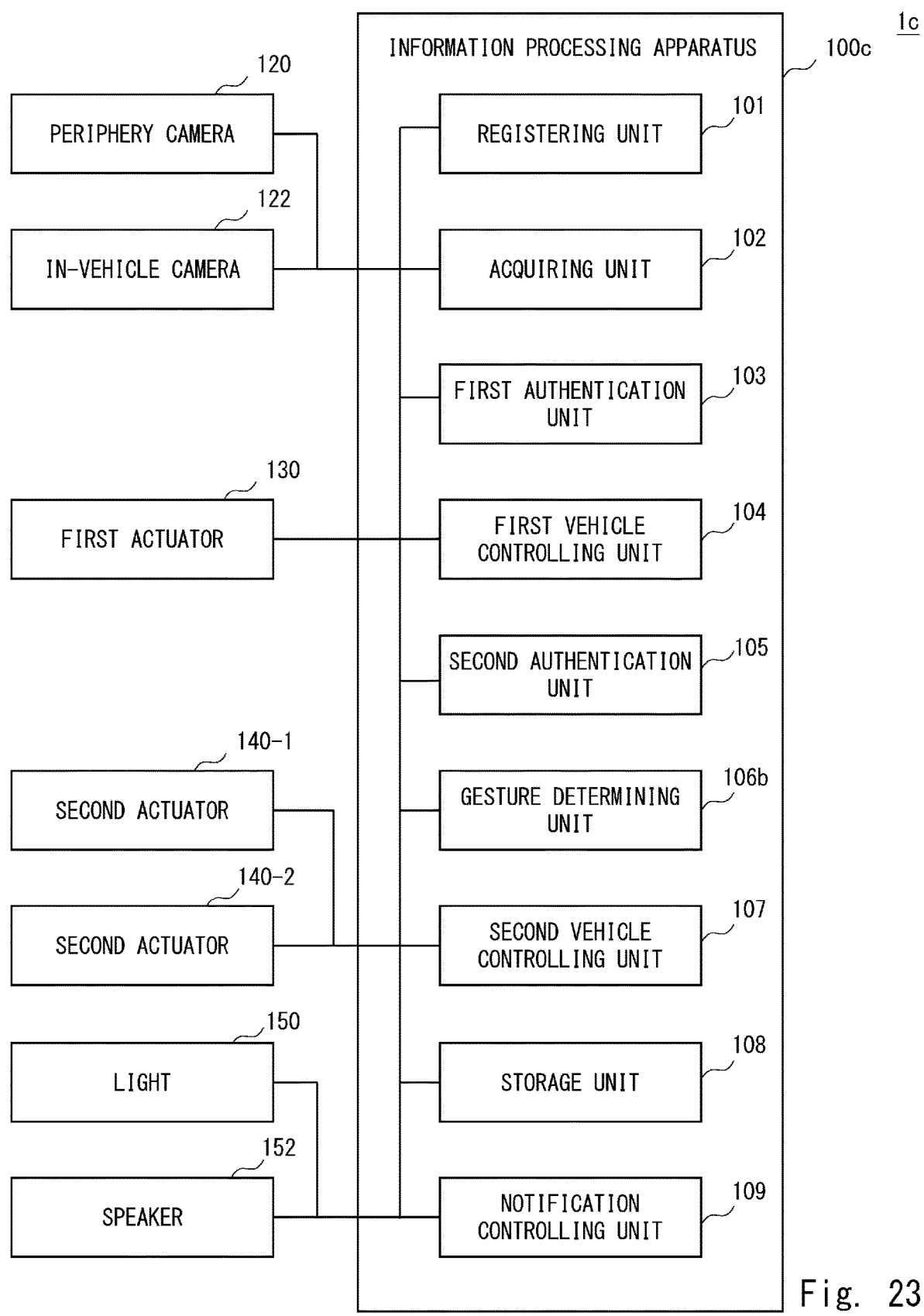
FIG. 23 is a block diagram showing a configuration of an in-vehicle system according to a fifth example embodiment.

Next, a fifth example embodiment of the present disclosure will be described. FIG. 23 is a block diagram showing a configuration of an in-vehicle system 1c according to the fifth example embodiment. The in-vehicle system 1c has a configuration and functions basically similar to the configuration and functions of the in-vehicle system 1b according to the fourth example embodiment. However, the in-vehicle system 1c includes a light 150, a speaker 152, and an information processing apparatus 100c in place of the information processing apparatus 100b.

The light 150 functions as a light output unit that outputs light. The speaker 152 functions as an audio output unit that outputs audio. Audio may be a warning sound or an operation sound. The light 150 and the speaker 152 are examples of a notifying unit provided in the vehicle V for providing a user U with specific information. The light 150 and the speaker 152 may be, respectively, a light and a speaker that are standard equipment of the vehicle V. The notifying unit is connected to a notification controlling unit 109 and controlled by the notification controlling unit 109. Herein, the notifying unit may include a display unit in place of or in addition to the light 150.

The information processing apparatus 100c basically includes, in addition to the components of the information processing apparatus 100b, the notification controlling unit 109.

The notification controlling unit 109 is also referred to as a notification controlling means. The notification controlling unit 109, with the use of the light 150 or the speaker 152, notifies a user of the start or a result of various processes performed by the information processing apparatus 100c. Various processes may include at least one of a first authentication process performed by the first authentication unit 103, a second authentication process performed by the second authentication unit 105, or a gesture determining process performed by the gesture determining unit 106b. Herein, the notification controlling unit 109 may control the light 150 and the speaker 152 such that the manner of notification differs depending on the type of a process or the start or end of a process.

For example, if a first authentication process is to be started, the notification controlling unit 109 causes the light 150 to blink once. A case in which a first authentication process is started may be a case in which a first captured image acquiring condition is satisfied. If the first authentication process is completed and it is determined that the user U is a registered user, the notification controlling unit 109 outputs an operation sound once from the speaker 152. Then, if a second authentication process is to be started, the notification controlling unit 109 causes the light 150 to blink twice. A case in which a second authentication process is started may be a case in which a second captured image acquiring condition is satisfied. If the second authentication process is completed and it is determined that the user U is a registered user, the notification controlling unit 109 outputs an operation sound twice from the speaker 152. Then, if a gesture determining process is to be started, the notification controlling unit 109 causes the light 150 to blink three times. If the gesture determining process is completed and it is determined that the gesture of the user U is a registered gesture, the notification controlling unit 109 outputs an operation sound three times from the speaker 152.

In this manner, according to the fifth example embodiment, the information processing apparatus 100c notifies a user U of the start or a result of various processes, and thus the user U can grasp the state of the vehicle V with ease. For example, the user U can take measures promptly if control of the vehicle V is executed unintentionally.

Sixth Example Embodiment

Next, a sixth example embodiment of the present disclosure will be described. The sixth example embodiment is a modified example of the fifth example embodiment, and one of the features of the sixth example embodiment is that an information processing apparatus uses, in a gesture determining process, a gesture determining model trained for each registered user.

Figures 24, 25:
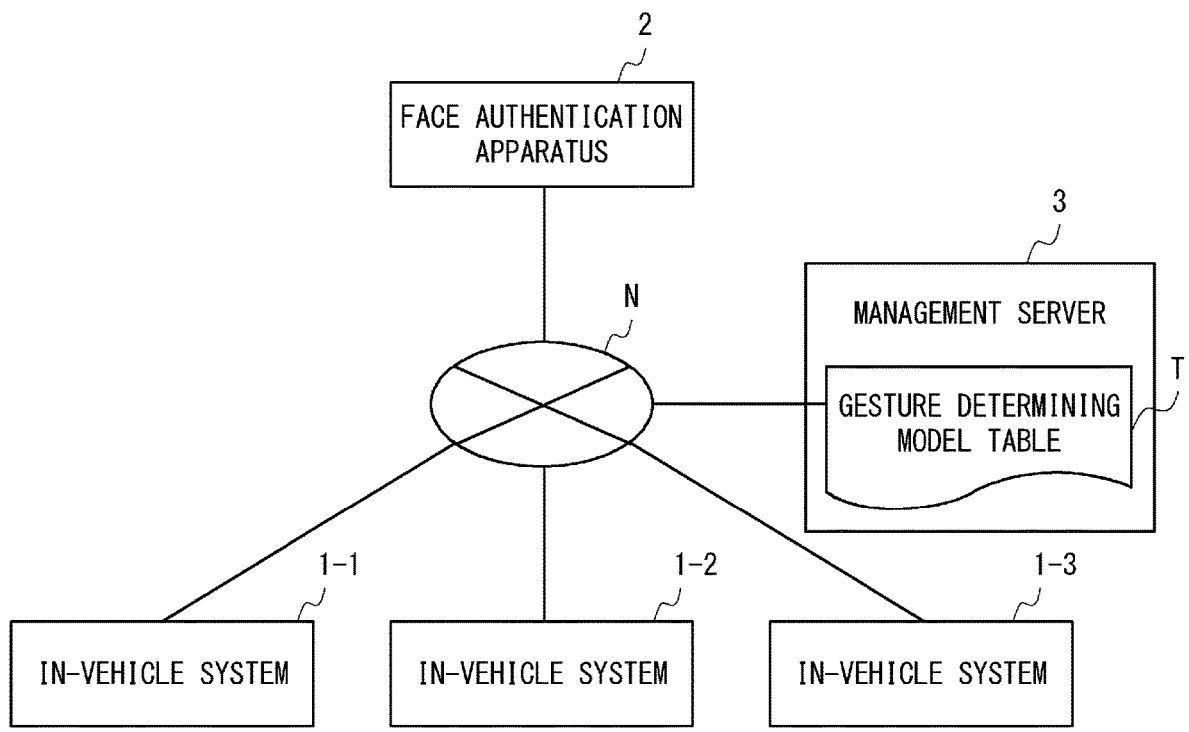
FIG. 24 is a block diagram showing an overall configuration of a vehicle controlling system according to a sixth example embodiment.
FIG. 25 shows one example of a data structure of a gesture determining model table according to the sixth example embodiment.

FIG. 24 is a block diagram showing an overall configuration of a vehicle controlling system 900d according to the sixth example embodiment. The vehicle controlling system 900d includes, in addition to the components of the vehicle controlling system 900, a management server 3.

The management server 3 acquires captured images of registered users executing registered gestures from in-vehicle systems 1 via the network N and trains a gesture determining model for each user. Thus, the management server 3 generates a gesture determining model reflecting each user's any specific way of making gestures. The management server 3 registers a generated gesture determining model into a gesture determining model table T with the gesture determining model linked to the user ID. The gesture determining model table T may be stored in a storage unit (not illustrated) of the management server 3. The management server 3 then, in response to a request from an in-vehicle system 1, transmits the gesture determining model linked to the user ID in the gesture determining model table T to the in-vehicle system 1.

Herein, the management server 3 may register trained parameters of a gesture determining model into the gesture determining model table T with the parameters linked to the user ID and, in response to a request from an in-vehicle system 1, transmit, to the in-vehicle system 1, the parameters of the gesture determining model linked to the user ID.

At an initial registration process, the information processing apparatus 100c of an in-vehicle system 1 transmits a generation request for a gesture determining model to the management server 3 via the network N. The generation request for the gesture determining model includes the user ID of the registered user sent from the face authentication apparatus 2 and a captured image of the registered user executing a registered gesture. Then, the information processing apparatus 100c of the in-vehicle system 1 receives the gesture determining model corresponding to the registered user from the management server 3 via the network N. Meanwhile, if the registered user of the vehicle V is to be changed and if a gesture determining model has already been generated for the changed registered user, the information processing apparatus 100c of the in-vehicle system 1 transmits an acquisition request for the gesture determining model to the management server 3 via the network N. The acquisition request for the gesture determining model includes the user ID of the changed registered user. Then, the information processing apparatus 100c of the in-vehicle system 1 receives the gesture determining model corresponding to the changed registered user from the management server 3 via the network N.

Then, the information processing apparatus 100c of the in-vehicle system 1 stores the gesture determining model received from the management server 3 into the storage unit 108 with the gesture determining model linked to the user ID of the registered user. Then, if the second authentication unit 105 determines that the user U is a registered user, the gesture determining unit 106b executes a gesture determination with the use of the gesture determining model corresponding to the user ID of the registered user.

FIG. 25 shows one example of a data structure of the gesture determining model table T according to the sixth example embodiment. In this figure, the gesture determining model table T links each user ID to its corresponding gesture determining model ID that identifies the gesture determining model.

In this manner, according to the sixth example embodiment, the information processing apparatus 100c controls a gesture determination with the use of a gesture determining model trained for each registered user, and thus the accuracy of gesture determination can be improved. Gesture determining models corresponding to user IDs are stored in the management server 3, and a gesture determining model is supplied to an in-vehicle system 1 as necessary. Therefore, a gesture determining model corresponding to a user U can be introduced into an in-vehicle system 1 with ease even in a case in which a registered user changes frequently as in car rentals or car sharing or a case in which the user U replaces a vehicle V with a new vehicle V. Accordingly, user-friendliness improves.

Although the management server 3 trains a gesture determining model for each registered user according to the sixth example embodiment, the management server 3 may train a gesture determining model for each user attribute. In one example, the user attribute may be the sex or the age. In this case, the management server 3 may register the user attribute and the gesture determining model into the gesture determining model table T with the user attribute and the gesture determining model linked to each other. The registering unit 101 of the information processing apparatus 100c of the in-vehicle system 1 may register, as user information, information linking the user ID and the user attribute information at the time of the registration process. The user attribute information may be acquired by the registering unit 101 via an input unit (not illustrated) that receives an input from the user or acquired by the registering unit 101 from the user terminal via the network N. Then, the information processing apparatus 100c may receive, from the management server 3, a gesture determining model corresponding to the user attribute linked to the user ID of the registered user at the time of an initial registration process or at the time of changing the registered user, and the information processing apparatus 100c may store the received gesture determining model into the storage unit 108 with the gesture determining model linked to the user ID.

Figure 26:
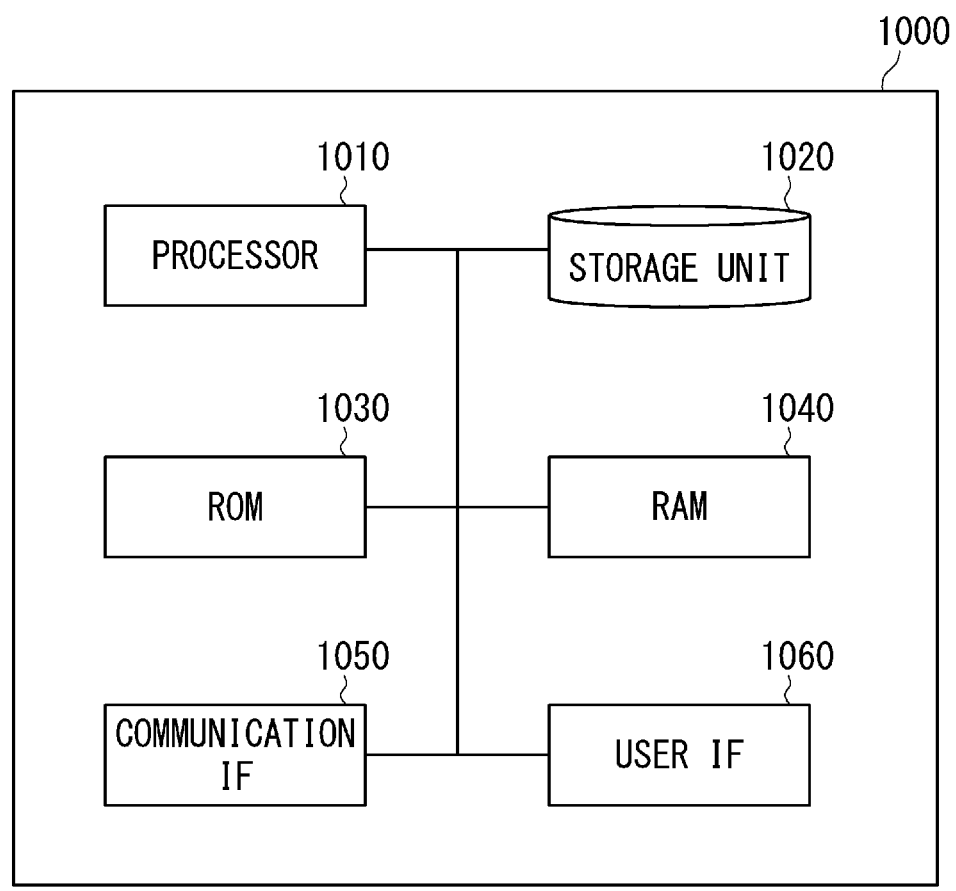
FIG. 26 shows an example of a configuration of a computer.

Next, a physical configuration of the face authentication apparatus 2, the information processing apparatus 100, 100a, 100b, or 100c, or the management server 3 will be described. FIG. 26 shows an example of a configuration of a computer that may be used as the face authentication apparatus 2, the information processing apparatus 100, 100a, 100b, or 100c, or the management server 3. A computer 1000 includes a processor 1010, a storage unit 1020, a ROM 1030, a RAM 1040, a communication interface (IF) 1050, and a user interface 1060.

The communication interface 1050 is an interface for connecting the computer 1000 to a communication network via a wired communication means or a wireless communication means. The user interface 1060 includes, for example, a display unit, such as a display. The user interface 1060 also includes an input unit, such as a keyboard, a mouse, or a touch panel.

The storage unit 1020 is an auxiliary storage device that can hold various pieces of data. The storage unit 1020 need not necessarily be a part of the computer 1000 and may be an external storage device or a cloud storage connected to the computer 1000 via a network.

The ROM 1030 is a nonvolatile storage device. A program that the processor 1010 executes may be stored in the storage unit 1020 or in the ROM 1030. The storage unit 1020 or the ROM 1030 stores various programs for implementing the functions of each unit of, for example, the face authentication apparatus 2, the information processing apparatus 100, 100a, 100b, or 100c, or the management server 3.

Such a program includes a set of instructions (or software codes) that, when loaded onto a computer, causes the computer to execute one or more functions described according the example embodiments. The program may be stored in a non-transitory computer-readable medium or in a tangible storage medium. As some non-limiting examples, a computer-readable medium or a tangible storage medium includes a random-access memory (RAM), a read-only memory (ROM), a flash memory, a solid-state drive (SSD), or other memory technologies; a CD-ROM, a digital versatile disc (DVD), a Blu-ray (registered trademark) disc, or other optical disc storages; or a magnetic cassette, a magnetic tape, a magnetic disk storage, or other magnetic storage devices. The program may be transmitted via a transitory computer-readable medium or via a communication medium. As some non-limiting examples, a transitory computer-readable medium or a communication medium includes an electrical, optical, or acoustic propagation signal or a propagation signal of any other forms.

The RAM 1040 is a volatile storage device. For the RAM 1040, various semiconductor memory devices, such as a dynamic random-access memory (DRAM) or a static random-access memory (SRAM), are used. The RAM 1040 may be used as an internal buffer that temporarily stores data and so forth. The processor 1010 loads a program stored in the storage unit 1020 or in the ROM 1030 onto the RAM 1040 and executes the program. The processor 1010 may be a central processing unit (CPU) or a graphics processing unit (GPU). As the processor 1010 executes a program, functions of each unit of the face authentication apparatus 2, the information processing apparatus 100, 100a, 100b, or 100c, or the management server 3 may be implemented. The processor 1010 may include an internal buffer that can temporarily store data and so forth.

In the foregoing example embodiments, a computer is constituted by a computer system including a personal computer or a word processor. This, however, is not a limiting example, and a computer can also be constituted by, for example but not limited to, a server in a local area network (LAN), a host of a computer (personal computer) communication, or a computer system connected to the internet. Furthermore, a computer can be constituted by a network as a whole with the functions distributed over devices on the network.

It is to be noted that the present disclosure is not limited to the foregoing example embodiments, and modifications can be made as appropriate within the scope that does not depart from the technical spirit. For example, the foregoing second to sixth example embodiments may be combined as desired. For example, the second example embodiment may be combined with the fifth example embodiment, or the third example embodiment may be combined with the fourth example embodiment or the fifth example embodiment.

Herein, according to the foregoing first example embodiment, a second captured image is a captured image generated by capturing an image of a scene surrounding the vehicle or an image of the interior of the vehicle while, for example, an opening and closing body of the vehicle is in an unlocked state under a predetermined condition. Meanwhile, according to the foregoing second to sixth example embodiments, if the doors of the vehicle V are in an unlocked state, the acquiring unit 102 supplies a captured image that is acquired from the periphery camera 120 or from the in-vehicle camera 122 and that satisfies the second captured image acquiring condition to the gesture determining unit 106 as a second captured image. The second captured image, however, may include a captured image generated by capturing an image of the interior of the vehicle while an opening and closing body of the vehicle is in a locked state. Therefore, even while the doors of the vehicle V are in a locked state, the acquiring unit 102 may supply a captured image that is acquired from the in-vehicle camera 122 and that satisfies the second captured image acquiring condition to the gesture determining unit 106 as a second captured image.

According to the foregoing second to sixth example embodiments, the face authentication apparatus 2 is connected to an information processing apparatus via the network N. Alternatively, functions of the face authentication apparatus 2 may be included in an information processing apparatus and connected to various constituent elements of the information processing apparatus via an internal bus.

Part or the whole of the foregoing example embodiments can be expressed also as in the following supplementary notes, which are not limiting.

SUPPLEMENTARY NOTE 1

An information processing apparatus including:
first authentication means configured to, based on a first captured image generated by capturing an image of a scene surrounding a vehicle, control biometric authentication of a person included in the first captured image and determine whether the person included in the first captured image is a registered user;
first vehicle controlling means configured to, if the person included in the first captured image is determined to be the registered user, transmit a first control signal for executing first control related to unlocking of an opening and closing body of the vehicle;
gesture determining means configured to, based on a second captured image generated by capturing an image of a scene surrounding the vehicle or an image of an interior of the vehicle, control a gesture determination of whether a gesture of a person included in the second captured image is a registered gesture; and
second vehicle controlling means configured to, if the gesture of the person included in the second captured image is the registered gesture, transmit a second control signal for executing second control different from the first control, the second control corresponding to the gesture of the person and performed on a predetermined opening and closing body of the vehicle or on a power source of the vehicle.

SUPPLEMENTARY NOTE 2

The information processing apparatus according to supplementary note 1, wherein the gesture determining means is configured to control the gesture determination based on the second captured image, if the opening and closing body of the vehicle is in an unlocked state.

SUPPLEMENTARY NOTE 3

The information processing apparatus according to supplementary note 1 or 2, wherein the registered gesture is set based at least one of on a direction of a person's gaze or on a direction of a person's face.

SUPPLEMENTARY NOTE 4

The information processing apparatus according to supplementary note 3, wherein the second control signal is a control signal for opening or closing the predetermined opening and closing body of the vehicle to a direction corresponding to the direction of the gaze or the direction of the face.

SUPPLEMENTARY NOTE 5

The information processing apparatus according to any one of supplementary notes 1 to 4, further including notification controlling means configured to provide a notification of a start or a result of a process performed by the first authentication means or a process performed by the gesture determining means.

SUPPLEMENTARY NOTE 6

The information processing apparatus according to supplementary note 5, wherein the notification controlling means is configured to provide the notification of the start or the result with use of a speaker or a light provided in the vehicle.

SUPPLEMENTARY NOTE 7

The information processing apparatus according to any one of supplementary notes 1 to 6, further including second authentication means configured to control biometric authentication of the person included in the second captured image based on the second captured image and determine whether the person included in the second captured image is the registered user,
wherein the gesture determining means controls the gesture determination if the person included in the second captured image is determined to be the registered user.

SUPPLEMENTARY NOTE 8

The information processing apparatus according to any one of supplementary notes 1 to 7, wherein the gesture determining means is configured to control the gesture determination if the person included in the second captured image is located in a region set in advance with the vehicle serving as a reference.

SUPPLEMENTARY NOTE 9

The information processing apparatus according to any one of supplementary notes 1 to 8, wherein the gesture determining means is configured to control the gesture determination if a size or a length of a face region of the person included in the second captured image is no less than a predetermined number of pixels or if a length connecting predetermined facial parts included in a face region of the person included in the second captured image is no less than a predetermined number of pixels.

SUPPLEMENTARY NOTE 10

The information processing apparatus according to any one of supplementary notes 1 to 9, wherein
the registered gesture is set according to each region set in advance with the vehicle serving as a reference, and
the gesture determining means is configured to determine whether the gesture of the person included in the second captured image is a registered gesture corresponding to a region in which the person is located.

SUPPLEMENTARY NOTE 11

The information processing apparatus according to any one of supplementary notes 1 to 10, wherein
the second control is set according to each gesture of a person and each region set in advance with the vehicle serving as a reference, and
the second vehicle controlling means is configured to transmit a second control signal for executing second control corresponding to the gesture of the person included in the second captured image and a region in which the person is located.

SUPPLEMENTARY NOTE 12

The information processing apparatus according to any one of supplementary notes 1 to 11, further including registering means configured to register the registered gesture based on an input from the registered user.

SUPPLEMENTARY NOTE 13

The information processing apparatus according to any one of supplementary notes 1 to 12, wherein the gesture determining means is configured to control the gesture determination with use of a gesture determining model trained for each registered user.

SUPPLEMENTARY NOTE 14

A vehicle controlling system including:
a biometric authentication apparatus configured to execute biometric authentication; and
an information processing apparatus,
wherein the information processing apparatus includes
first authentication means configured to cause the biometric authentication apparatus to execute, based on a first captured image generated by capturing an image of a scene surrounding a vehicle, biometric authentication of a person included in the first captured image and determine whether the person included in the first captured image is a registered user,
first vehicle controlling means configured to, if the person included in the first captured image is determined to be the registered user, transmit a first control signal for executing first control related to unlocking of an opening and closing body of the vehicle,
gesture determining means configured to, based on a second captured image generated by capturing an image of a scene surrounding the vehicle or an image of an interior of the vehicle, control a gesture determination of whether a gesture of a person included in the second captured image is a registered gesture, and
second vehicle controlling means configured to, if the gesture of the person included in the second captured image is the registered gesture, transmit a second control signal for executing second control different from the first control, the second control corresponding to the gesture of the person and performed on a predetermined opening and closing body of the vehicle or on a power source of the vehicle.

SUPPLEMENTARY NOTE 15

The vehicle controlling system according to supplementary note 14, wherein
the information processing apparatus includes second authentication means configured to control biometric authentication of the person included in the second captured image based on the second captured image and determine whether the person included in the second captured image is the registered user, and
the gesture determining means is configured to control the gesture determination if the person included in the second captured image is determined to be the registered user.

SUPPLEMENTARY NOTE 16

The vehicle controlling system according to supplementary note 15, further including a management server configured to store a gesture determining model trained for each registered user, wherein the gesture determining means is configured to control the gesture determination with use of a gesture determining model acquired from the management server and corresponding to a registered user.

SUPPLEMENTARY NOTE 17

An information processing method including:
a first authentication step of, based on a first captured image generated by capturing an image of a scene surrounding a vehicle, controlling biometric authentication of a person included in the first captured image and determining whether the person included in the first captured image is a registered user;
a first vehicle controlling step of, if the person included in the first captured image is determined to be the registered user, transmitting a first control signal for executing first control related to unlocking of an opening and closing body of the vehicle;
a gesture determining step of, based on a second captured image generated by capturing an image of a scene surrounding the vehicle or an image of an interior of the vehicle, controlling a gesture determination of whether a gesture of a person included in the second captured image is a registered gesture; and
a second vehicle controlling step of, if the gesture of the person included in the second captured image is the registered gesture, transmitting a second control signal for executing second control different from the first control, the second control corresponding to the gesture of the person and performed on a predetermined opening and closing body of the vehicle or on a power source of the vehicle.

SUPPLEMENTARY NOTE 18

A non-transitory computer-readable medium storing a program that causes a computer to execute:
a first authentication step of, based on a first captured image generated by capturing an image of a scene surrounding a vehicle, controlling biometric authentication of a person included in the first captured image and determining whether the person included in the first captured image is a registered user;
a first vehicle controlling step of, if the person included in the first captured image is determined to be the registered user, transmitting a first control signal for executing first control related to unlocking of an opening and closing body of the vehicle;
a gesture determining step of, based on a second captured image generated by capturing an image of a scene surrounding the vehicle or an image of an interior of the vehicle, controlling a gesture determination of whether a gesture of a person included in the second captured image is a registered gesture; and
a second vehicle controlling step of, if the gesture of the person included in the second captured image is the registered gesture, transmitting a second control signal for executing second control different from the first control, the second control corresponding to the gesture of the person and performed on a predetermined opening and closing body of the vehicle or on a power source of the vehicle.

REFERENCE SIGNS LIST 1, 1a, 1b, 1c IN-VEHICLE SYSTEM
2 FACE AUTHENTICATION APPARATUS
3 MANAGEMENT SERVER
10, 100, 100a, 100b, 100c INFORMATION PROCESSING SYSTEM (INFORMATION PROCESSING APPARATUS)
13, 103 FIRST AUTHENTICATION UNIT
14, 104 FIRST VEHICLE CONTROLLING UNIT
16, 106, 106a, 106b GESTURE DETERMINING UNIT
17, 107, 107a SECOND VEHICLE CONTROLLING UNIT
101 REGISTERING UNIT
102, 102a ACQUIRING UNIT
105 SECOND AUTHENTICATION UNIT
108 STORAGE UNIT
109 NOTIFICATION CONTROLLING UNIT
120 PERIPHERY CAMERA
122 IN-VEHICLE CAMERA
130 FIRST ACTUATOR
140 SECOND ACTUATOR
150 LIGHT
152 SPEAKER
210 FACE INFORMATION DB
211 USER ID
212 FACIAL FEATURE INFORMATION
220 DETECTION UNIT
230 FEATURE POINT EXTRACTING UNIT
240 REGISTERING UNIT
250 AUTHENTICATION UNIT
900, 900d VEHICLE CONTROLLING SYSTEM
1000 COMPUTER
1010 PROCESSOR
1020 STORAGE UNIT
1030 ROM
1040 RAM
1050 COMMUNICATION INTERFACE
1060 USER INTERFACE
V VEHICLE
U USER
N NETWORK
A REGION
B REGION
T GESTURE DETERMINING MODEL TABLE

What is claimed is:
1. An information processing apparatus comprising:
at least one memory storing instructions; and
at least one processor configured to execute the instructions to:
based on a first captured image generated by capturing an image of a scene surrounding a vehicle, control biometric authentication of a person included in the first captured image and determine whether the person included in the first captured image is a registered user;
if the person included in the first captured image is determined to be the registered user, transmit a first control signal for executing first control related to unlocking of an opening and closing body of the vehicle;
based on a second captured image generated by capturing an image of a scene surrounding the vehicle or an image of an interior of the vehicle, control a gesture determination of whether a gesture of a person included in the second captured image is a registered gesture; and
if the gesture of the person included in the second captured image is the registered gesture, transmit a second control signal for executing second control different from the first control, the second control corresponding to the gesture of the person and per- formed on a predetermined opening and closing body of the vehicle or on a power source of the vehicle.

2. The information processing apparatus according to claim 1, wherein the at least one processor is further configured to execute the instructions to control the gesture determination based on the second captured image, if the opening and closing body of the vehicle is in an unlocked state.

3. The information processing apparatus according to claim 1, wherein the registered gesture is set based at least one of on a direction of a person's gaze or on a direction of a person's face.

4. The information processing apparatus according to claim 3, wherein the second control signal is a control signal for opening or closing the predetermined opening and closing body of the vehicle to a direction corresponding to the direction of the gaze or the direction of the face.

5. The information processing apparatus according to claim 1, wherein the at least one processor is further configured to execute the instructions to provide a notification of a start or a result of a process for controlling biometric authentication of the person included in the first captured image and determining whether the person included in the first captured image is a registered user or a process for controlling the gesture determination of whether the gesture of the person included in the second captured image is the registered gesture.

6. The information processing apparatus according to claim 5, wherein the at least one processor is further configured to execute the instructions to provide the notification of the start or the result with use of a speaker or a light provided in the vehicle.

7. The information processing apparatus according to claim 1, wherein the at least one processor is further configured to execute the instructions to:
control biometric authentication of the person included in the second captured image based on the second captured image and determine whether the person included in the second captured image is the registered user; and
control the gesture determination if the person included in the second captured image is determined to be the registered user.

8. The information processing apparatus according to claim 1, wherein the at least one processor is further configured to execute the instructions to control the gesture determination if the person included in the second captured image is located in a region set in advance with the vehicle serving as a reference.

9. The information processing apparatus according to claim 1, wherein the at least one processor is further configured to execute the instructions to control the gesture determination if a size or a length of a face region of the person included in the second captured image is no less than a predetermined number of pixels or if a length connecting predetermined facial parts included in a face region of the person included in the second captured image is no less than a predetermined number of pixels.

10. The information processing apparatus according to claim 1, wherein
the registered gesture is set according to each region set in advance with the vehicle serving as a reference, and
the at least one processor is further configured to execute the instructions to determine whether the gesture of the person included in the second captured image is a registered gesture corresponding to a region in which the person is located.

11. The information processing apparatus according to claim 1, wherein
the second control is set according to each gesture of a person and each region set in advance with the vehicle serving as a reference, and
the at least one processor is further configured to execute the instructions to transmit a second control signal for executing second control corresponding to the gesture of the person included in the second captured image and a region in which the person is located.

12. The information processing apparatus according to claim 1, wherein the at least one processor is further configured to execute the instructions to register the registered gesture based on an input from the registered user.

13. The information processing apparatus according to claim 1, wherein the at least one processor is further configured to execute the instructions to control the gesture determination with use of a gesture determining model trained for each registered user.

14. A vehicle controlling system comprising:
a biometric authentication apparatus configured to execute biometric authentication; and
an information processing apparatus,
wherein the information processing apparatus includes
at least one memory storing instructions; and
at least one processor configured to execute the instructions to:
cause the biometric authentication apparatus to execute, based on a first captured image generated by capturing an image of a scene surrounding a vehicle, biometric authentication of a person included in the first captured image and determine whether the person included in the first captured image is a registered user,
if the person included in the first captured image is determined to be the registered user, transmit a first control signal for executing first control related to unlocking of an opening and closing body of the vehicle,
based on a second captured image generated by capturing an image of a scene surrounding the vehicle or an image of an interior of the vehicle, control a gesture determination of whether a gesture of a person included in the second captured image is a registered gesture, and
if the gesture of the person included in the second captured image is the registered gesture, transmit a second control signal for executing second control different from the first control, the second control corresponding to the gesture of the person and performed on a predetermined opening and closing body of the vehicle or on a power source of the vehicle.

15. The vehicle controlling system according to claim 14, wherein the at least one processor is further configured to execute the instructions to:
control biometric authentication of the person included in the second captured image based on the second captured image and determine whether the person included in the second captured image is the registered user; and
control the gesture determination if the person included in the second captured image is determined to be the registered user.

16. The vehicle controlling system according to claim 15, further comprising a management server configured to store a gesture determining model trained for each registered user,
wherein the at least one processor is further configured to execute the instructions to control the gesture determination with use of a gesture determining model acquired from the management server and corresponding to a registered user.

17. An information processing method comprising:
a first authentication step of, based on a first captured image generated by capturing an image of a scene surrounding a vehicle, controlling biometric authentication of a person included in the first captured image and determining whether the person included in the first captured image is a registered user;
a first vehicle controlling step of, if the person included in the first captured image is determined to be the registered user, transmitting a first control signal for executing first control related to unlocking of an opening and closing body of the vehicle;
a gesture determining step of, based on a second captured image generated by capturing an image of a scene surrounding the vehicle or an image of an interior of the vehicle, controlling a gesture determination of whether a gesture of a person included in the second captured image is a registered gesture; and
a second vehicle controlling step of, if the gesture of the person included in the second captured image is the registered gesture, transmitting a second control signal for executing second control different from the first control, the second control corresponding to the gesture of the person and performed on a predetermined opening and closing body of the vehicle or on a power source of the vehicle.

* * * * *